US009990902B2

(12) United States Patent
Jung et al.

(10) Patent No.: US 9,990,902 B2
(45) Date of Patent: Jun. 5, 2018

(54) ELECTRONIC DEVICE FOR ADJUSTING BRIGHTNESS OF SCREEN AND METHOD THEREOF

(71) Applicant: Samsung Electronics Co., Ltd., Suwon-si, Gyeonggi-do (KR)

(72) Inventors: Eui-Chang Jung, Seoul (KR); Hyuk Kang, Yongin-si (KR); Jeong-Min Park, Hwaseong-si (KR); Eun-Jung Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 14/080,158

(22) Filed: Nov. 14, 2013

(65) Prior Publication Data

US 2014/0139560 A1 May 22, 2014

(30) Foreign Application Priority Data

Nov. 16, 2012 (KR) ........................ 10-2012-0130229

(51) Int. Cl.
*G06F 3/0485* (2013.01)
*G09G 5/10* (2006.01)
*G09G 3/20* (2006.01)

(52) U.S. Cl.
CPC ................. *G09G 5/10* (2013.01); *G09G 3/20* (2013.01); *G09G 2320/0626* (2013.01); *G09G 2354/00* (2013.01); *G09G 2360/144* (2013.01)

(58) Field of Classification Search
None
See application file for complete search history.

(56) References Cited

U.S. PATENT DOCUMENTS

| | | | | |
|---|---|---|---|---|
| 9,155,048 | B2 * | 10/2015 | Hong | H04W 52/027 |
| 2005/0081164 | A1 * | 4/2005 | Hama | G06F 3/0482 715/830 |
| 2006/0229557 | A1 * | 10/2006 | Fathallah | G06F 19/3406 604/131 |
| 2007/0195074 | A1 | 8/2007 | Gelissen | |
| 2010/0123686 | A1 * | 5/2010 | Klinghult et al. | 345/178 |

(Continued)

FOREIGN PATENT DOCUMENTS

| | | | |
|---|---|---|---|
| CN | 1770085 | A | 5/2006 |
| CN | 102216885 | A | 10/2011 |

(Continued)

OTHER PUBLICATIONS

European Patent Office Search report for Application 13193111.5-1904/2733693 dated Jul. 21, 2014, reference: P6048073EP.

*Primary Examiner* — Amr Awad
*Assistant Examiner* — Donna Lui
(74) *Attorney, Agent, or Firm* — Jefferson IP Law, LLP

(57) ABSTRACT

An operation method of an electronic device is provided. The operation method includes detecting a movement speed of contents being scrolled, if the detected movement speed is determined as being equal to or greater than a set speed, changing a brightness of a screen having been displayed at a first brightness, into a second brightness, and changing the brightness of the screen from the second brightness to the first brightness according to a changing movement speed of the contents being scrolled.

10 Claims, 20 Drawing Sheets

(56) References Cited

U.S. PATENT DOCUMENTS

| | | | | |
|---|---|---|---|---|
| 2010/0188270 | A1* | 7/2010 | Sampsell | G06F 3/0421 341/31 |
| 2010/0269038 | A1* | 10/2010 | Tsuda | G06F 3/04886 715/702 |
| 2011/0181541 | A1* | 7/2011 | Kuo | 345/174 |
| 2011/0279700 | A1 | 11/2011 | Steinberg et al. | |
| 2012/0212407 | A1* | 8/2012 | Tanaka | G06F 3/013 345/156 |
| 2013/0141453 | A1* | 6/2013 | Devara et al. | 345/589 |
| 2013/0335319 | A1* | 12/2013 | Balasundaram | G06F 3/0488 345/156 |
| 2014/0092015 | A1* | 4/2014 | Xing | G06K 9/00315 345/158 |

FOREIGN PATENT DOCUMENTS

| | | | |
|---|---|---|---|
| CN | 102395946 | A | 3/2012 |
| KR | 10-2007-0043469 | A | 4/2007 |
| KR | 10-2011-0032906 | A | 3/2011 |
| KR | 10-2012-0023722 | A | 3/2012 |
| TW | 201126298 | A | 8/2011 |

* cited by examiner

ELECTRONIC DEVICE FOR ADJUSTING BRIGHTNESS OF SCREEN AND METHOD THEREOF

CROSS-REFERENCE TO RELATED APPLICATION(S)

This application claims the benefit under 35 U.S.C. § 119(a) of a Korean patent application filed on Nov. 16, 2012 in the Korean Intellectual Property Office and assigned Serial No. 10-2012-0130229, the entire disclosure of which is hereby incorporated by reference.

TECHNICAL FIELD

The present disclosure relates to an electronic device. More particularly, the present disclosure relates to an electronic device for adjusting the brightness of the screen and a method thereof.

BACKGROUND

A user using an electronic device may feel eyestrain due to brightness of a screen of the electronic device. For example, when the user opens contents displayed on a touch screen of the electronic device in a location where the surrounding brightness of the electronic device is dark, he/she may experience a dazzling phenomenon due to a difference between the surrounding brightness and the brightness of the screen of the electronic device. Also, despite the surrounding brightness of the electronic device not being too dark or bright, the user may feel eyestrain in a process of scrolling contents displayed on the touch screen of the electronic device in order to open the contents of the electronic device.

However, the related-art electronic device does not include a way for automatically adjusting the brightness of the screen of the electronic device in order to mitigate user's eyestrain when contents being displayed on the touch screen of the electronic device are scrolled.

Accordingly, there is a need for an electronic device capable of individually detecting users' eyestrain which can be differentiated according to each user and automatically adjusting the brightness of the screen of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method capable of detecting a speed of contents being scrolled on a touch screen of an electronic device and automatically adjusting the brightness of the screen, thereby mitigating user's eyestrain.

Another aspect of the present disclosure is to provide an apparatus and method capable of detecting in real-time a changing speed of contents being scrolled on a touch screen of an electronic device and automatically stepwise adjusting the brightness of the screen, thereby improving a user's convenience.

A further aspect of the present disclosure is to provide an apparatus and method capable of automatically adjusting the brightness of the screen even when at least one sensor is not provided in an electronic device.

Yet another aspect of the present disclosure is to provide an apparatus and method capable of, even when malfunction takes place in any one sensor provided in an electronic device, automatically activating at least one other sensor to prevent the occurring malfunction.

Still another aspect of the present disclosure is to provide an apparatus and method capable of accurately measuring eyestrain which can be different according to a user.

The above aspects are addressed by providing an electronic device for adjusting the brightness of the screen and a method thereof.

In accordance with an aspect of the present disclosure, an operation method of an electronic device is provided. The method includes detecting a movement speed of contents being scrolled, if the detected movement speed is determined as being equal to or greater than a set speed, changing a brightness of a screen having been displayed at a first brightness, into a second brightness, and changing the brightness of the screen from the second brightness to the first brightness according to a changing movement speed of the contents being scrolled.

The method may further include sensing that the contents being displayed at the first brightness are being scrolled.

The first brightness may be a set default brightness.

The second brightness may be a set darkest brightness.

If the detected movement speed is determined as being equal to or greater than the set speed, the changing of the brightness of the screen having been displayed at the first brightness into the second brightness may include, if the detected movement speed is determined as being equal to or greater than the set speed, driving a camera module to capture an image in a set direction, if a set part is included in the captured image, analyzing a variation of the set part, and, if the analyzed variation of the set part is determined as being equal to or greater than a set variation, changing the brightness of the screen having been displayed at the first brightness, into the second brightness.

If the detected movement speed is determined as being equal to or greater than the set speed, the changing of the brightness of the screen having been displayed at the first brightness into the second brightness may include, if the detected movement speed is determined as being equal to or greater than the set speed, driving a camera module to capture an image in a set direction, if a set part is not comprised in the captured image, determining if at least one grip sensor provided in a set portion senses a variation of a set pressure, and, if the at least one grip sensor senses the variation of the set pressure, changing the brightness of the screen having been displayed at the first brightness, into the second brightness.

The set part may be at least one part of a pupil of a human, eyebrows, and a distance between the eyebrows.

The changing of the brightness of the screen from the second brightness to the first brightness according to the changing movement speed of the contents being scrolled may include sensing the changing movement speed of the contents being scrolled, identifying that the sensed movement speed of the contents corresponds to any one speed level among set at least two or more speed levels, changing the brightness of the screen into any one brightness of the screen matching to the identified speed level among set at least two or more brightness of the screen, and, when a scrolling status of the contents is a stop status, changing the brightness of the screen into the first brightness.

In accordance with another aspect of the present disclosure, an operation method of an electronic device is provided. The method includes sensing a variation of pressure with at least one sensor provided in a set portion, and, if the sensed variation of pressure is equal to or is greater than a set variation, changing a brightness of a screen having been displayed at a first brightness, into a second brightness.

The method may further include displaying the screen at the first brightness.

The first brightness may be a set default brightness.

The second brightness may be a set darkest brightness.

The sensor may be a grip sensor.

The method may further include counting time from a time when the brightness of the screen is changed into the second brightness, changing the brightness of the screen into any one brightness of the screen matching to the counted time among set at least two or more brightness of the screen, and, when the counted time exceeds a set time, changing the brightness of the screen into the first brightness.

In accordance with a further aspect of the present disclosure, an operation method of an electronic device is provided. The method includes determining if a measured surrounding brightness is sensed as being equal to or greater than a set brightness, and measuring at least one of a variation of a set part and a variation of a set pressure according to the sensed surrounding brightness, and changing a brightness of a screen having been displayed at a first brightness, into a second brightness.

The method may further include displaying the screen at the first brightness.

The first brightness may be a set default brightness.

The second brightness may be a set darkest brightness.

The method may further include measuring the surrounding brightness.

The measuring of the at least one of the variation of the set part and the variation of the set pressure according to the sensed surrounding brightness, and the changing of the brightness of the screen having been displayed at the first brightness into the second brightness may include, if the sensed surrounding brightness is sensed as being equal to or greater than the set brightness, driving a camera module to capture an image in a set direction, if the set part is included in the captured image, analyzing the variation of the set part, and, if the analyzed variation of the set part is determined as being equal to or greater than a set variation, changing the brightness of the screen having been displayed at the first brightness, into the second brightness.

The measuring of the at least one of the variation of the set part and the variation of the set pressure according to the sensed surrounding brightness, and the changing of the brightness of the screen having been displayed at the first brightness into the second brightness may include, if the sensed surrounding brightness is not sensed as being equal to or greater than the set brightness, determining whether displayed contents are being scrolled, if the contents are being scrolled, detecting a movement speed of the contents being scrolled, if the detected movement speed is determined as being equal to or greater than a set speed, driving a camera module to capture an image in a set direction, if the set part is included in the captured image, analyzing the variation of the set part, and, if the analyzed variation of the set part is determined as being equal to or greater than a set variation, changing the brightness of the screen having been displayed at the first brightness, into the second brightness.

The measuring of the at least one of the variation of the set part and the variation of the set pressure according to the sensed surrounding brightness, and the changing of the brightness of the screen having been displayed at the first brightness into the second brightness may include, if the sensed surrounding brightness is sensed as being equal to or greater than the set brightness, sensing a variation of pressure with at least one sensor provided in a set portion, and, if the sensed variation of pressure is equal to or is greater than a set variation, changing the brightness of the screen having been displayed at the first brightness, into the second brightness.

The measuring at least one of the variation of the set part and the variation of the set pressure according to the sensed surrounding brightness, and the changing of the brightness of the screen having been displayed at the first brightness into the second brightness may include, if the sensed surrounding brightness is not sensed as being equal to or greater than the set brightness, determining if displayed contents are being scrolled, if the displayed contents are being scrolled, sensing a variation of pressure with at least one sensor provided in a set portion, and, if the sensed variation of pressure is equal to or is greater than a set variation, changing the brightness of the screen having been displayed at the first brightness, into the second brightness.

The measuring of the at least one of the variation of the set part and the variation of the set pressure according to the sensed surrounding brightness, and the changing of the brightness of the screen having been displayed at the first brightness into the second brightness may include, if the sensed surrounding brightness is sensed as being equal to or greater than the set brightness, driving a camera module to capture an image in a set direction, if the set part is not included in the captured image, determining whether at least one grip sensor provided in a set portion senses the variation of the set pressure, and, if the at least one grip sensor senses the variation of the set pressure, changing the brightness of the screen having been displayed at the first brightness, into the second brightness.

The measuring of the at least one of the variation of the set part and the variation of the set pressure according to the sensed surrounding brightness, and the changing of the brightness of the screen having been displayed at the first brightness into the second brightness may include, if the sensed surrounding brightness is not sensed as being equal to or greater than the set brightness, determining if displayed contents are being scrolled, if the contents are being scrolled, detecting a movement speed of the contents being scrolled, if the detected movement speed is determined as being equal to or greater than a set speed, driving a camera module to capture an image in a set direction, if the set part is not included in the captured image, determining whether at least one grip sensor provided in a set portion senses the variation of the set pressure, and, if the at least one grip sensor senses the variation of the set pressure, changing the brightness of the screen having been displayed at the first brightness, into the second brightness.

The set part may be at least one part of a pupil of a human, eyebrows, and a distance between the eyebrows.

The method may further include counting time from a time when the brightness of the screen is changed into the second brightness, changing the brightness of the screen into any one brightness of the screen matching to the counted time among set at least two or more brightness of the screen, and, when the counted time exceeds a set time, changing the brightness of the screen into the first brightness.

The method may further include sensing the changing movement speed of the contents being scrolled, identifying that the sensed movement speed of the contents corresponds to any one speed level among set at least two or more speed levels, changing the brightness of the screen into any one brightness of the screen matching to the identified speed level among set at least two or more brightness of the screen, and, when a scrolling status of the contents is a stop status, changing the brightness of the screen into the first brightness.

In accordance with yet another aspect of the present disclosure, an electronic device includes a processor unit and a memory. The processor unit is configured to detect a movement speed of contents being scrolled and, if the detected movement speed is determined as being equal to or greater than a set speed, to change the brightness of the screen having been displayed at a first brightness, into a second brightness, and changes a brightness of a screen from the second brightness to the first brightness according to a changing movement speed of the contents being scrolled. The memory configured to store data controlled in the processor unit.

The processor unit may be configured to sense that the contents being displayed at the first brightness are being scrolled.

The first brightness may be a set default brightness.

The second brightness may be a set darkest brightness.

The device may further include a camera module configured to, if the detected movement speed is determined as being equal to or greater than the set speed, capture an image in a set direction. If a set part is included in the captured image, the processor unit may be configured to analyze a variation of the set part. If the analyzed variation of the set part is determined as being equal to or greater than a set variation, the processor unit may be configured to change the brightness of the screen having been displayed at the first brightness, into the second brightness.

The device may further include a camera module configured to, if the detected movement speed is determined as being equal to or greater than the set speed, capturing an image in a set direction. If a set part is not included in the captured image, the processor unit may be configured to determine if at least one grip sensor provided in a set portion senses a variation of a set pressure. If the at least one grip sensor senses the variation of the set pressure, the processor unit may be configured to change the brightness of the screen having been displayed at the first brightness, into the second brightness.

The set part may be at least one part of a pupil of a human, eyebrows, and a distance between the eyebrows.

The processor unit may be configured to sense the changing movement speed of the contents being scrolled, to identify that the sensed movement speed of the contents corresponds to any one speed level among set at least two or more speed levels, to change the brightness of the screen into any one brightness of the screen matching to the identified speed level among the set at least two or more brightness of the screen and, when a scrolling status of the contents is a stop status, to change the brightness of the screen into the first brightness.

In accordance with still another aspect of the present disclosure, an electronic device includes a sensor unit and a processor unit. The sensor unit senses a variation of pressure with at least one sensor provided in a set portion. If the sensed variation of pressure is equal to or is greater than a set variation, the processor unit changes the brightness of the screen having been displayed at a first brightness, into a second brightness.

The device may further include displaying the screen at the first brightness.

The first brightness may be a set default brightness.

The second brightness may be a set darkest brightness.

The sensor may be a grip sensor.

The processor unit may be configured to count time from the time when the brightness of the screen is changed into the second brightness, to change the brightness of the screen into any one brightness of the screen matching to the counted time among set at least two or more brightness of the screen and, when the counted time exceeds a set time, to change the brightness of the screen into the first brightness.

In accordance with still another aspect of the present disclosure, an electronic device includes a sensor unit and a processor unit. The sensor unit is configured to determine if a measured surrounding brightness is sensed as being equal to or greater than a set brightness. The processor unit is configured to measure at least one of a variation of a set part and a variation of a set pressure according to the sensed surrounding brightness, and to change a brightness of a screen having been displayed at a first brightness, into a second brightness.

The processor unit may be configured to display the screen at the first brightness.

The first brightness may be a set default brightness.

The second brightness may be a set darkest brightness.

The sensor unit may be configured to measure the surrounding brightness.

The device may further include a camera module configured to, if the sensed surrounding brightness is sensed as being equal to or greater than the set brightness, capture an image in a set direction. If the set part is included in the captured image, the processor unit may be configured to analyze the variation of the set part. If the analyzed variation of the set part is determined as being equal to or greater than a set variation, the processor unit may be configured to change the brightness of the screen having been displayed at the first brightness, into the second brightness.

If the sensed surrounding brightness is not sensed as being equal to or greater than the set brightness, the processor unit may be configured to determine whether displayed contents are being scrolled. If the contents are being scrolled, the processor unit may be configured to detect a movement speed of the contents being scrolled. The device may further include a camera module configured to, if the detected movement speed is determined as being equal to or greater than a set speed, capture an image in a set direction. If the set part is included in the captured image, the processor unit may be configured to analyze the variation of the set part. If the analyzed variation of the set part is determined as being equal to or greater than a set variation, the processor unit may be configured to change the brightness of the screen having been displayed at the first brightness, into the second brightness.

If the sensed surrounding brightness is sensed as being equal to or greater than the set brightness, the sensor unit may be configured to sense a variation of pressure with at least one sensor provided in a set portion. If the sensed variation of pressure is equal to or is greater than a set variation, the processor unit may be configured to change the brightness of the screen having been displayed at the first brightness, into the second brightness.

If the sensed surrounding brightness is not sensed as being equal to or greater than the set brightness, the processor unit may be configured to determine if displayed contents are being scrolled. If the sensed variation of pressure is equal to or is greater than a set variation, the processor unit may be configured to change the brightness of the screen having been displayed at the first brightness, into the second brightness. If the displayed contents are being scrolled, the sensor unit may be configured to sense a variation of pressure with at least one sensor provided in a set portion.

The device may further include a camera module configured to, if the sensed surrounding brightness is sensed as being equal to or greater than the set brightness, capture an image in a set direction. If the set part is not included in the captured image, the processor unit may be configured to determine if at least one grip sensor provided in a set portion senses the variation of the set pressure. If the at least one grip sensor senses the variation of the set pressure, the processor unit may be configured to change the brightness of the screen having been displayed at the first brightness, into the second brightness.

The device may further include a camera module configured to, if the detected movement speed is determined as being equal to or greater than a set speed, capture an image in a set direction. If the sensed surrounding brightness is not sensed as being equal to or greater than the set brightness, the processor unit may be configured to determine if displayed contents are being scrolled. If the contents are being scrolled, the processor unit may be configured to detect a movement speed of the contents being scrolled. If the set part is not included in the captured image, the processor unit may be configured to determine if at least one grip sensor provided in a set portion senses the variation of the set pressure. If the at least one grip sensor senses the variation of the set pressure, the processor unit may be configured to change the brightness of the screen having been displayed at the first brightness, into the second brightness.

The set part may be at least one part of a pupil of a human, eyebrows, and a distance between the eyebrows.

The processor unit may be configured to count time from the time when the brightness of the screen is changed into the second brightness, to change the brightness of the screen into any one brightness of the screen matching to the counted time among set at least two or more brightness of the screen and, when the counted time exceeds a set time, to change the brightness of the screen into the first brightness.

The processor unit may be configured to sense the changing movement speed of the contents being scrolled, to identify that the sensed movement speed of the contents corresponds to any one speed level among set at least two or more speed levels, to change the brightness of the screen into any one brightness of the screen matching to the identified speed level among the set at least two or more brightness of the screen, and, when a scrolling status of the contents is a stop status, to change the brightness of the screen into the first brightness.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1A to 1D are diagrams illustrating an embodiment of automatically adjusting a brightness of a screen by detecting a movement speed of at least one content being scrolled on a touch screen of an electronic device according to an embodiment of the present disclosure.

Figure 1A:
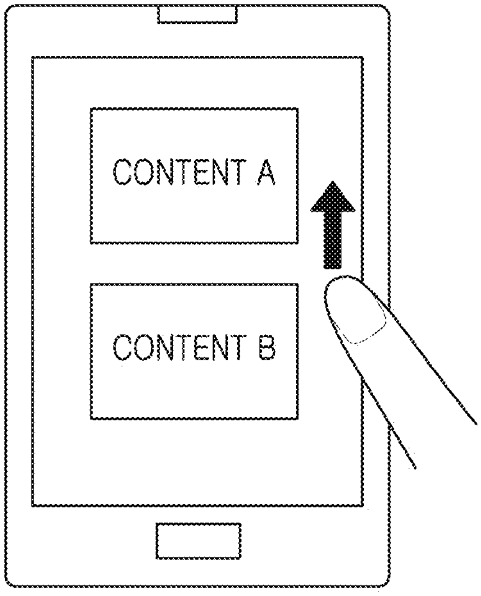
FIGS. 1A, 1B, 1C, and 1D are diagrams illustrating an embodiment of automatically adjusting a brightness of a screen by detecting a movement speed of at least one content being scrolled on a touch screen of an electronic device according to an embodiment of the present disclosure.
Figure 1B:
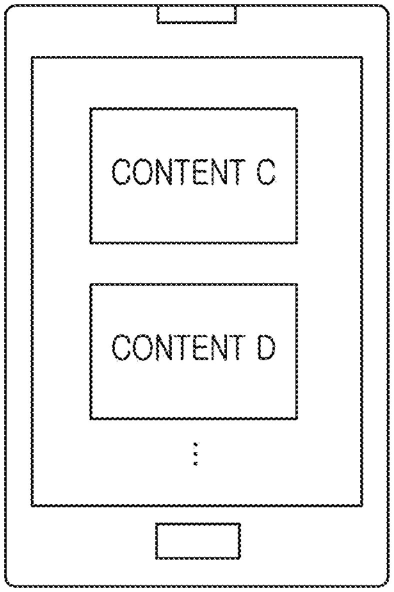

First, as illustrated in FIG. 1A, the electronic device can sense that at least one content being displayed at a first brightness is being scrolled. Here, the first brightness can be defined as a set default brightness. In detail, the electronic device can sense that the at least one content being displayed on a touch screen at the first brightness being the set default brightness is being scrolled. For example, "content A" and "content B" have been displayed on the touch screen of the electronic device, and the electronic device can sense a motion of scrolling up so as to display contents that are currently unseen on the touch screen because being located at the lower side of the touch screen of the electronic device. After that, as illustrated in FIG. 1B, the electronic device can detect a movement speed of the contents being scrolled and concurrently, sequentially display at least one content that is currently unseen on the touch screen because being located at the lower side of the touch screen of the electronic device. For example, if the electronic device senses the motion of scrolling up, the electronic device can display on the touch screen "content C", "content D", etc. being at least one content that is currently unseen on the touch screen because being located at the lower side of the touch screen of the electronic device.

Figure 1C:
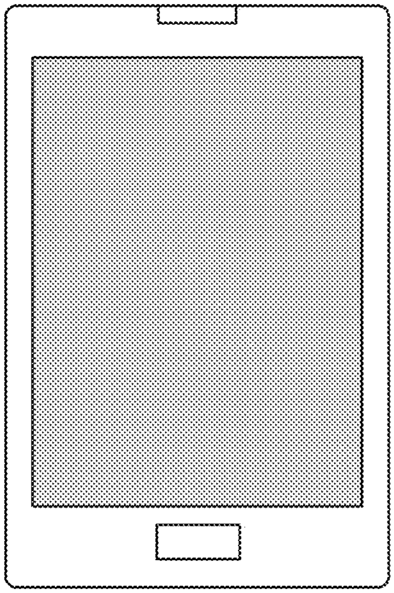

Next, as illustrated in FIG. 1C, the electronic device can detect the movement speed of the contents being scrolled, and give a dimming effect to the brightness of the screen. In detail, the electronic device can detect the movement speed of the contents being scrolled and, if the detected movement speed is determined as being equal to or greater than a set speed, the electronic device can change the brightness of the screen having been displayed at a first brightness, into a second brightness. Here, the second brightness can be defined as the set darkest brightness. That is, the electronic device can detect the movement speed of the contents being scrolled and, if the detected movement speed is determined as being equal to or greater than the set speed, the electronic device can adjust the brightness of the screen to the set lowest brightness. For example, assume that "brightness A" denotes the second brightness set as the lowest brightness in the electronic device, and "brightness B" denotes brightness set as a higher brightness, and "brightness C" denotes the first brightness being a default brightness set as a much higher brightness. Also, assume that "V3" denotes the set speed for giving the dimming effect to the brightness of the screen in the electronic device. Also, assume that, while displaying at least one content at the originally set default brightness "brightness C", the electronic device senses that the displayed content is being scrolled. In the aforementioned assumption, if the movement speed of the contents being scrolled is detected equal to or greater than the set speed "V3" in the electronic device, the electronic device can automatically adjust the brightness of the screen to the set lowest brightness "brightness A". In detail, if the movement speed of the content being scrolled is detected equal to or greater than the set speed in the electronic device, the electronic device can automatically adjust the brightness of the screen from the first brightness being the originally set default brightness to the second brightness being the set lowest brightness. Accordingly, there is an advantage of reducing the occurrence of eyestrain caused by a color of at least one content when the user opens at least one content of different color and size scrolled and moved on the touch screen of the electronic device. That is, if the electronic device senses that at least one content being displayed is being scrolled at a set speed or more while displaying the screen at the first brightness being the set default brightness, the electronic device can automatically adjust the brightness of the screen to the second brightness being the set lowest brightness.

Figure 1D:
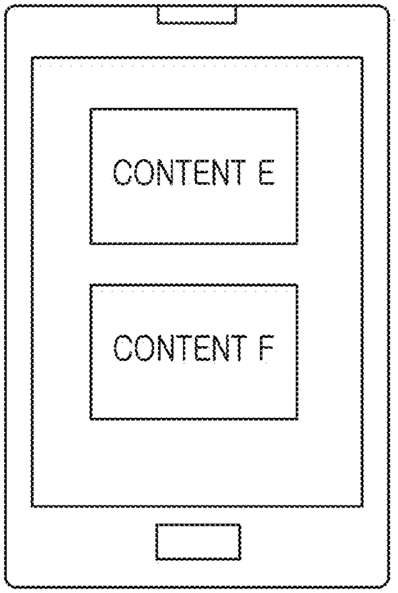

After that, as illustrated in FIG. 1D, the electronic device can change the brightness of the screen from the second brightness to the first brightness according to the changing movement speed of the contents being scrolled. First, the electronic device can detect the changing movement speed of the contents being scrolled, and identify that the detected movement speed of the contents corresponds to any one speed level among set at least two or more speed levels. For example, assume that "brightness A" denotes the second brightness set as the lowest brightness in the electronic device, and "brightness B" denotes brightness set as a higher brightness, and "brightness C" denotes the first brightness being a default brightness set as a much higher brightness. Also, assume that "V2" denotes a set speed for giving the dimming effect to the brightness of the screen in the electronic device. Also, assume that, while displaying at least one content at the originally set default brightness "brightness C", the electronic device senses that the displayed content is being scrolled at the set speed "V2" or more. Also, assume that a first speed level corresponding to "brightness C" is set to a movement speed of contents between 0 and V1, and a second speed level corresponding to "brightness B" is set to a movement speed of contents between V1 and V2, and a third speed level corresponding to "brightness A" is set to a movement speed of contents of V2 or more. In the aforementioned assumption, the electronic device can detect the changing movement speed of the contents being scrolled, and identify that the detected movement speed of the contents corresponds to the third speed level.

Next, the electronic device can change the brightness of the screen into any one brightness of the screen matching to the identified speed level among the set at least two or more brightness of the screen. In detail, if the electronic device senses a motion of scrolling in any direction and scrolls at least one content, a speed of scrolling the at least one content may decrease as time goes. In the aforementioned example, the electronic device can identify that the initially detected movement speed of contents corresponds to the third speed level, and change the brightness of the screen into the second brightness, i.e., "brightness A" matching to the third speed level. Next, the electronic device can identify that a movement speed of contents detected after the lapse of a predetermined time corresponds to the second speed level, and change the brightness of the screen into "brightness B" matching to the second speed level. After that, if a scrolling status of contents is a stop status, the electronic device can change the brightness of the screen into the first brightness, i.e., "brightness C" matching to the first speed level and display "content E" and "content F". In detail, when a scrolling status of at least one content being scrolled in the electronic device is a stop status, the electronic device can change the brightness of the screen into the first brightness being the originally set default brightness. For example, in a case where there is no screen scrollable at the top or bottom of a contents page of the electronic device, in a case where a scrolling speed becomes '0' and thus a scrolling status is a stop status, in a case where the electronic device senses a new touch input, and in a case where the electronic device senses a hovering input approaching the screen, the electronic device can change the brightness of the screen into the first brightness being the originally set default brightness. That is, if at least one content is being scrolled at the set speed or more, the electronic device can adjust the brightness of the screen to the set lowest brightness and then, change the brightness of the screen into any one brightness of the screen matching to the identified speed level among the set at least two or more brightness of the screen. Accordingly, there is an advantage that the electronic device can automatically adjust the brightness of the screen according to a scrolling speed of contents displayed on the touch screen, reducing user's eyestrain.

Also, an opacity filter may be provided in the electronic device of the present disclosure and give a blur effect of preventing user's dazzling. In detail, if a movement speed of at least one content being scrolled on the touch screen of the electronic device is determined as being equal to or greater than a set speed, the electronic device can stepwise adjust the transparency of the touch screen by using the opacity filter provided in the electronic device. For example, assume that "V2" denotes a set speed for stepwise adjusting the transparency of the touch screen of the electronic device by using the opacity filter provided in the electronic device. Also, assume that, while displaying at least one content at an originally set default transparency "transparency C", the electronic device senses that the displayed content is being scrolled at the set speed "V2" or more. In the aforementioned assumption, the electronic device can sense that at least one content being displayed is being scrolled at the set speed "V2" or more, and adjust the transparency of the at least one content being scrolled to the lowest transparency "transparency 0". Next, the electronic device can stepwise increase the transparency of the at least one content being scrolled on the touch screen of the electronic device, and adjust it to the original transparency "transparency C". In conclusion, the electronic device of the present disclosure can give the blur effect for preventing the user's dazzling, by providing the opacity filter in the electronic device.

FIGS. 2A to 2D are diagrams illustrating an embodiment of automatically adjusting a brightness of a screen by driving a camera module according to an embodiment of the present disclosure.

Figure 2A:
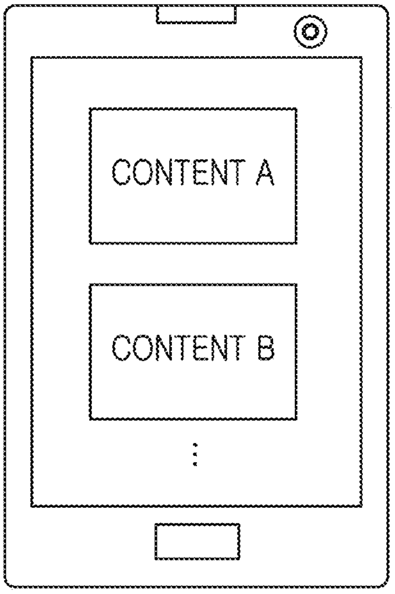
FIGS. 2A, 2B, 2C, and 2D are diagrams illustrating an embodiment of automatically adjusting a brightness of a screen by driving a camera module according to an embodiment of the present disclosure.

First, as illustrated in FIG. 2A, the electronic device can sense that at least one content being displayed at a first brightness is being scrolled. In detail, the electronic device can sense that the at least one content being displayed on a touch screen at the first brightness being a set default brightness is being scrolled. For example, "content A" and "content B" have been displayed on the touch screen of the electronic device, and the electronic device can sense a motion of scrolling up so as to display contents that are currently unseen on the touch screen because being located at the lower side of the touch screen of the electronic device. After that, the electronic device can detect a movement speed of the contents being scrolled and concurrently, sequentially display at least one content that is currently unseen on the touch screen because being located at the lower side of the touch screen of the electronic device. For example, if the electronic device senses the motion of scrolling up, the electronic device can display on the touch screen "content C", "content D", etc. being at least one content that is currently unseen on the touch screen because being located at the lower side of the touch screen of the electronic device.

Figure 2B:
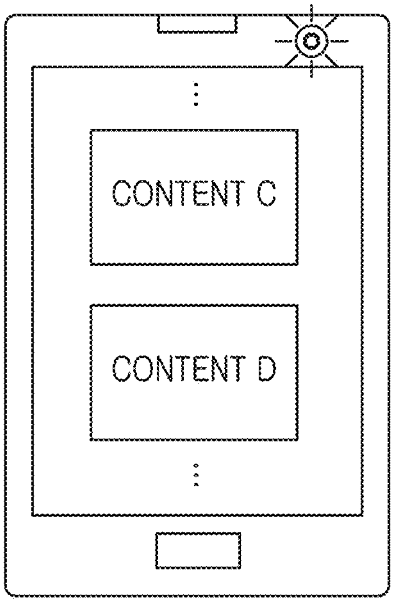

After that, as illustrated in FIG. 2B, the electronic device can detect the movement speed of the contents being scrolled, and change the brightness of the screen having been displayed at the first brightness, into a second brightness according to the detected movement speed. First, if the detected movement speed of contents being scrolled is determined as being equal to or greater than a set speed in the electronic device, the electronic device can drive a camera module to capture an image in a set direction. In detail, the electronic device can detect a movement speed of at least one content being scrolled and, if the detected movement speed is determined as being equal to or greater than the set speed, the electronic device can drive the camera module to capture an image in the set direction. For example, assume that the set movement speed is equal to "V2", and the set direction is a front portion of the electronic device. In the aforementioned assumption, if a movement speed of "content C" and "content D" being scrolled is detected equal to or greater than the set speed "V2" in the electronic device, the electronic device can capture an image with the front being the set direction.

Figure 2C:
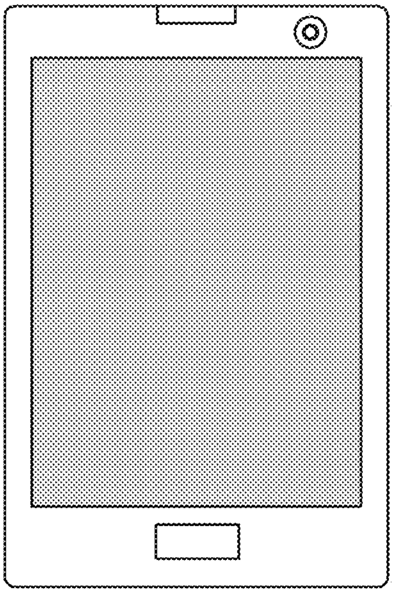

As illustrated in FIG. 2C, if a set part is included in a front image captured by the electronic device, the electronic device can analyze a variation of the set part and, if the analyzed variation of the set part is determined as being equal to or greater than a set variation, the electronic device can change the brightness of the screen having been displayed at the first brightness, into the second brightness. Here, the set part can be at least one part among the pupil of a human, eyebrows, and a distance between the eyebrows. In detail, if it is determined that at least one part among the set parts, which are the pupil of a human, the eyebrows, and the distance between the eyebrows, is included in the captured image as the result of capturing the image in the set direction in the electronic device, the electronic device can analyze the variation of the set part. If the variation of the set part is determined as being equal to or greater than the set variation, the electronic device can change the brightness of the screen from the first brightness being the original default brightness to the second brightness being the set lowest brightness. Accordingly, there is an advantage of reducing the occurrence of eyestrain caused by a color of at least one content when the user opens at least one content of different color and size scrolled and moved on the touch screen of the electronic device.

Figure 2D:
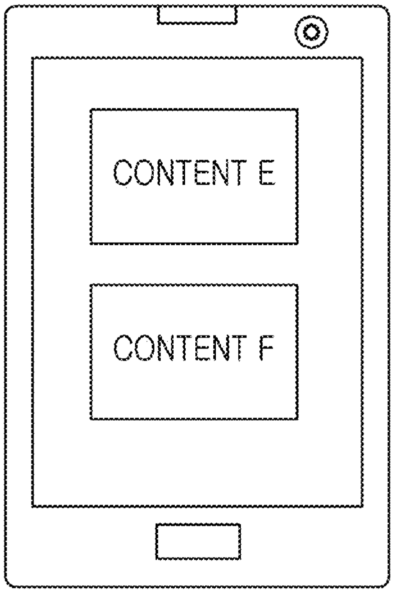

After that, as illustrated in FIG. 2D, the electronic device can change the brightness of the screen from the second brightness to the first brightness according to the changing movement speed of the contents being scrolled. First, the electronic device can sense the changing movement speed of the contents being scrolled, and identify that the sensed movement speed of the contents corresponds to any one speed level among set at least two or more speed levels. For example, assume that "brightness A" denotes the second brightness set as the lowest brightness in the electronic device, and "brightness B" denotes brightness set as a higher brightness, and "brightness C" denotes the first brightness being a default brightness set as a much higher brightness. Also, assume that "V2" denotes a set speed for giving a dimming effect to the brightness of the screen in the electronic device. Also, assume that, while displaying at least one content at the originally set default brightness "brightness C", the electronic device senses that the displayed content is being scrolled at the set speed "V2" or more. Also, assume that the result of capturing an image in the set direction in the electronic device is that the set part is included in the captured image, and the result of analyzing the variation of the set part is that the variation of the set part is determined as being equal to or greater than the set variation. Also, assume that a first speed level corresponding to "brightness C" is set to a movement speed of contents between 0 and V1, and a second speed level corresponding to "brightness B" is set to a movement speed of contents between V1 and V2, and a third speed level corresponding to "brightness A" is set to a movement speed of contents of V2 or more. In the aforementioned assumption, the electronic device can sense the changing movement speed of the contents being scrolled, and identify that the sensed movement speed of the contents corresponds to the third speed level.

Next, the electronic device can change the brightness of the screen into any one brightness of the screen matching to the identified speed level among the set at least two or more brightness of the screen. In detail, if the electronic device senses a motion of scrolling in any direction and scrolls at least one content, a speed of scrolling the at least one content may decrease as time goes. In the aforementioned example, the electronic device can identify that the initially sensed movement speed of contents corresponds to the third speed level, and change the brightness of the screen into the second brightness, i.e., "brightness A" matching to the third speed level. Next, the electronic device can identify that a movement speed of contents sensed after the lapse of a predetermined time corresponds to the second speed level, and change the brightness of the screen into "brightness B" matching to the second speed level. After that, if a scrolling status of contents is a stop status, the electronic device can change the brightness of the screen into the first brightness, i.e., "brightness C" matching to the first speed level and display "content E" and "content F". In detail, when a scrolling status of at least one content being scrolled in the electronic device is a stop status, the electronic device can change the brightness of the screen into the first brightness being the originally set default brightness. For example, in a case where there is no screen scrollable at the top or bottom of a contents page of the electronic device, in a case where a scrolling speed becomes '0' and thus a scrolling status is a stop status, in a case where the electronic device senses a new touch input, and in a case where the electronic device senses a hovering input approaching the screen, the electronic device can change the brightness of the screen into the first brightness being the originally set default brightness.

Figure 3A:
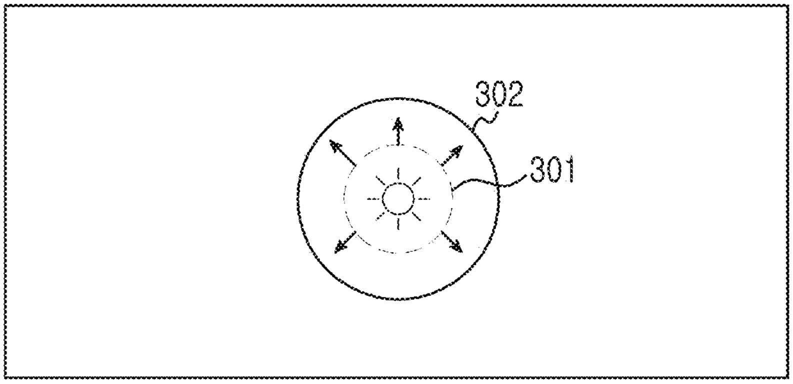
FIGS. 3A, 3B, and 3C are diagrams illustrating an embodiment of determining a variation of a set part according to an embodiment of the present disclosure.
Figure 3B:
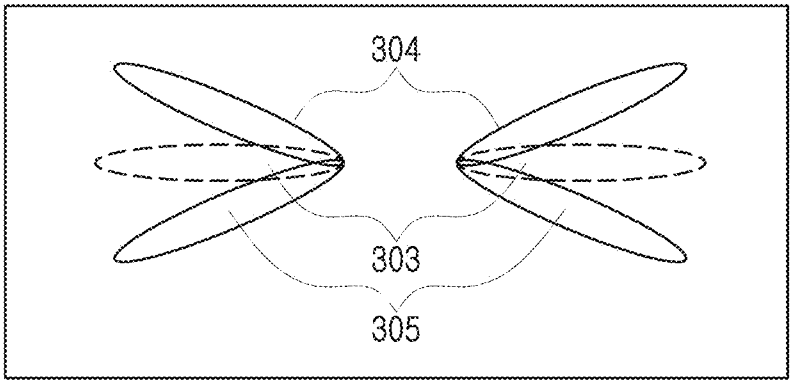
Figure 3C:
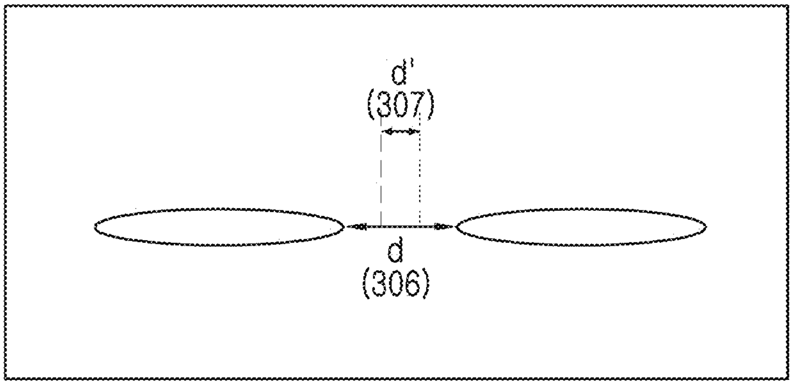

FIGS. 3A to 3C are diagrams illustrating an embodiment of determining a variation of a set part according to an embodiment of the present disclosure. Here, the set part can be at least one part among the pupil of a human, eyebrows, and a distance between the eyebrows. First, when a camera module is set to operate in an electronic device, the electronic device can capture an image in a set direction if the electronic device senses that at least one content being scrolled is being scrolled at a set speed or more. For example, assume that the set movement speed is equal to "V2", and the set direction is a front portion of the electronic device. In the aforementioned assumption, if a movement speed of "content C" and "content D" being scrolled is detected equal to or greater than the set speed "V2" in the electronic device, the electronic device can capture an image in the front being the set direction. After that, if it is determined that the set part is included in the captured image in the electronic device, the electronic device can determine whether a variation of the set part is equal to or is greater than a set variation.

FIG. 3A is a diagram illustrating an embodiment of a variation of the pupil of a human being one of the set parts according to an embodiment of the present disclosure. First, a user using an electronic device can capture an image of the pupil of a human of normal times and then, store the captured image in the electronic device and store the captured image into database. In detail, the reason of capturing an image and storing the pupil of a human of normal times in the electronic device is for determining whether a variation of the pupil of a human varying according to the brightness of the screen is equal to or is greater than the set variation. That is, if a movement speed of at least one content being scrolled is detected equal to or greater than a set speed in the electronic device, the electronic device can capture an image in a set direction and determine whether the variation of the pupil being a set part included in the captured image is equal to or is greater than the set variation.

This is for determining whether the user is feeling his/her eyestrain by means of a variation of a size of the pupil in the electronic device, because the size of the pupil can increase when the surrounding brightness is suddenly changed brighter. For example, if the pupil of the user being one of the set parts is included in the image captured by the electronic device, the electronic device can compare a size of the pupil of the user in the captured image with a stored size 301 of the pupil of the user of normal times. If the size of the pupil of the user in the captured image is determined as being equal to or greater than a set size 302 of the pupil in the electronic device, the electronic device can identify that the variation of the pupil being the set part is equal to or is greater than the set variation.

FIG. 3B is a diagram illustrating an embodiment of a variation of eyebrows of a human being one of the set parts according to an embodiment of the present disclosure. First, a user using an electronic device can capture an image of the eyebrows of a human of normal times and then, store the captured image in the electronic device and store the captured image into database. In detail, the reason for capture an image and storing the captured image of the eyebrows of a human of normal times in the electronic device is for determining whether a variation of the eyebrows of a human varying according to the brightness of the screen is equal to or is greater than a set variation. That is, if a movement speed of at least one content being scrolled is detected equal to or greater than a set speed in the electronic device, the electronic device can capture an image in a set direction and determine whether the variation of the eyebrows being a set part included in the captured image is equal to or is greater than the set variation. This is for determining whether the user is feeling his/her eyestrain by means of a variation of positions of the eyebrows in the electronic device, because the positions of the eyebrows can vary when the surrounding brightness is suddenly changed brighter. For example, if the eyebrows of the user being one of the set parts are included in the image captured by the electronic device, the electronic device can compare the positions of the eyebrows of the user in the captured image with stored positions 303 of the eyebrows of the user of normal times. If the positions of the eyebrows of the user in the captured image are varied equal to or greater than set positions 304 and 305 of the eyebrows in the electronic device, the electronic device can identify that the variation of the eyebrows being the set part is equal to or is greater than the set variation.

FIG. 3C is a diagram illustrating an embodiment of a variation of a distance between eyebrows of a human being one of the set parts according to an embodiment of the present disclosure. First, a user using an electronic device can capture an image of the distance between the eyebrows of the user of normal times and then, store the captured image in the electronic device and store the captured image into database. In detail, the reason for capturing an image and storing the captured image of the distance between the eyebrows of the user of normal times in the electronic device is for determining whether the variation of the distance between the eyebrows of the user varying according to the brightness of the screen is equal to or is greater than a set variation. That is, if a movement speed of at least one content being scrolled is detected equal to or greater than a set speed in the electronic device, the electronic device can capture an image in a set direction and determine whether the variation of the distance between the eyebrows being a set part included in the captured image is equal to or is greater than the set variation. This is for determining whether the user is feeling his/her eyestrain by means of the variation of the distance between the eyebrows, because the distance between the eyebrows of a human can get shorter than the normal times when the surrounding brightness is suddenly changed brighter. For example, if the distance between the eyebrows of the user being one of the set parts is included in the image captured by the electronic device, the electronic device can compare the distance between the eyebrows of the user in the captured image with a stored distance (d) 306 between the eyebrows of the user of normal times. If the distance in the captured image between the eyebrows of the user is varied shorter than a set distance (d') 307 between the eyebrows in the electronic device, the electronic device can identify that the variation of the distance between the eyebrows being the set part is equal to or is greater than the set variation.

Figure 4A:
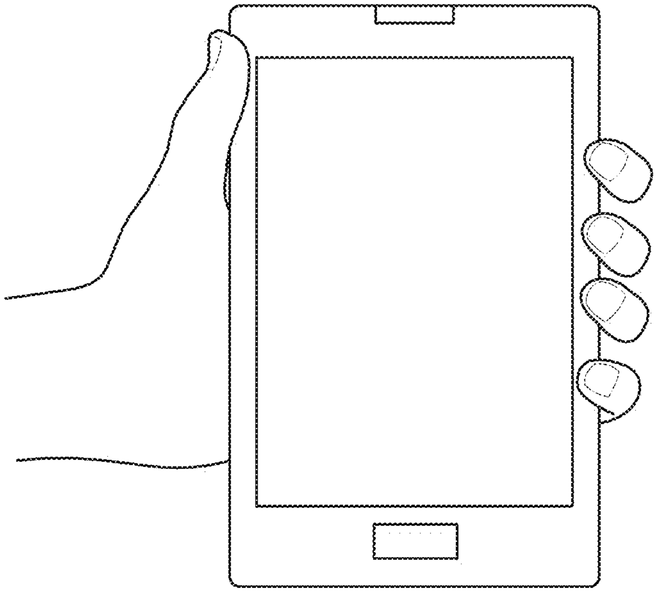
FIGS. 4A and 4B are diagrams illustrating an embodiment of automatically adjusting a brightness of a screen by using a grip sensor according to an embodiment of the present disclosure.
Figure 4B:
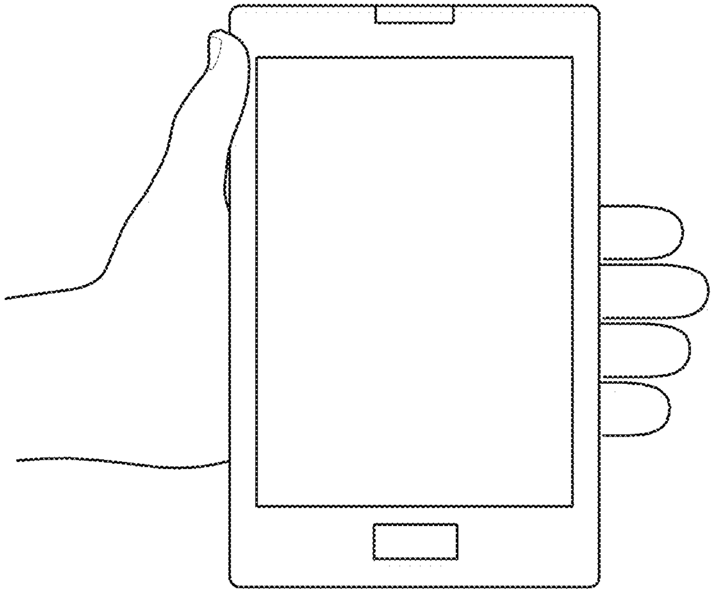

FIGS. 4A and 4B are diagrams illustrating an embodiment of automatically adjusting a brightness of a screen by using a grip sensor according to an embodiment of the present disclosure.

First, an electronic device can display a screen at a first brightness. Here, the first brightness can be a set default brightness. In detail, the electronic device can display the screen at the first brightness being the set default brightness. After that, when the electronic device senses a variation of pressure with at least one sensor provided in a set portion, if the sensed variation of pressure is equal to or is greater than a set variation, the electronic device can change the brightness of the screen having been displayed at the first brightness, into a second brightness. Here, the at least one sensor provided in the set portion can be a grip sensor, and the second brightness can be the set darkest brightness. In detail, if the variation of pressure sensed in the at least one grip sensor provided in the set portion is equal to or is greater than the set variation, the electronic device can change the brightness of the screen having been displayed at the first brightness being the set default brightness, into the second brightness being the set darkest brightness.

As illustrated in FIG. 4A and FIG. 4B, if the grip sensors provided in left and right portions of the electronic device sense the variation of pressure equal to or greater than the set variation, the electronic device can change the brightness of the screen from a manually set default brightness to the set darkest brightness. For example, assume that the user makes a motion of scrolling the screen up or down in order to open a portion that is not currently displayed on a touch screen but is located at the lower side or upper side of contents. In the aforementioned assumption, if the user feels eyestrain due to at least one content being scrolled, he/she can apply more pressure than the first and makes a motion of gripping the electronic device such that the grip sensors provided at the left side and right side of the electronic device can sense the variation of pressure equal to or greater than the set variation. That is, as illustrated in FIG. 4A, if the electronic device senses the variation of pressure equal to or greater than the set variation from the grip sensors, the electronic device can change the brightness of the screen from the set default brightness to the set darkest brightness.

Alternately, in the aforementioned assumption, if the user feels eyestrain due to at least one content being scrolled, he/she can make a motion of releasing gripping of the electronic device at the left side and right side such that the grip sensors provided at the left side and right side of the electronic device can sense the variation of pressure equal to or greater than the set variation. That is, as illustrated in FIG. 4B, if the grip sensor senses the variation of pressure equal to or greater than the set variation, the electronic device can change the brightness of the screen from the set default brightness to the set darkest brightness. That is, in this embodiment, the brightness of the screen of the electronic device is manually changed, but there is an advantage of being capable of reflecting instant user's eyestrain without using other sensors or modules. Here, the grip sensors may be provided at the left side and right side of the electronic device, or may be provided at the upper side and lower side of the electronic device as well. Accordingly, even when the electronic device is not only gripped vertically but also is gripped horizontally, the electronic device can sense the variation of pressure. Also, this embodiment can be applied anytime if the user feels eyestrain due to contents being displayed on the touch screen of the electronic device or due to a change of the surrounding brightness, etc., irrespective of whether or not the screen is being scrolled in the electronic device.

Next, the electronic device can count time from the time when the brightness of the screen is changed into the second brightness, and change the brightness of the screen into any one brightness of the screen matching to the counted time among set at least two or more brightness of the screen. In detail, the electronic device can count time from the time when the brightness of the screen is changed into the set darkest brightness, and gradually change the brightness of the screen into any one brightness of the screen matching to the counted time among the set at least two or more brightness of the screen. For example, assume that the electronic device senses equal to or greater than a variation of a set pressure from the grip sensor, and changes the brightness of the screen into the set darkest brightness. Also, assume that "brightness A" is set as the brightness of the screen to a period of time of 0 second to 5 seconds, and "brightness B" is set as the brightness of the screen to a period of time of 6 seconds to 10 seconds, and "brightness C" is set as the brightness of the screen to a period of time of 11 seconds to 15 seconds. In the aforementioned assumption, the electronic device can start counting time after changing the brightness of the screen into the darkest brightness "brightness A". After that, if the time counted in the electronic device is between 0 second and 5 seconds, the electronic device can continuously maintain the changed brightness of the screen as "brightness A". Unlike this, if the time counted in the electronic device is between 6 seconds and 10 seconds, the electronic device can change the changed brightness of the screen from "brightness A" to "brightness B". Continuously, if the time counted in the electronic device exceeds 11 seconds, the electronic device can change the brightness of the screen into the originally set default brightness "brightness C". That is, if it is determined that the time counted in the electronic device exceeds 11 seconds being a set time, the electronic device can change the brightness of the screen into the originally set default brightness "brightness C".

FIGS. 5A to 5D are diagrams illustrating an embodiment of automatically adjusting a brightness of a screen by using a camera module and a grip sensor according to an embodiment of the present disclosure.

Figure 5A:
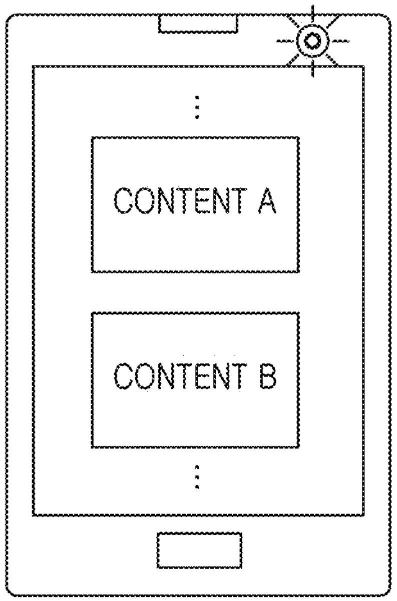
FIGS. 5A, 5B, 5C, and 5D are diagrams illustrating an embodiment of automatically adjusting a brightness of a screen by using a camera module and a grip sensor according to an embodiment of the present disclosure.

First, as illustrated in FIG. 5A, the electronic device can sense that at least one content being displayed at a first brightness is being scrolled. In detail, the electronic device can sense that the at least one content being displayed on a touch screen at the first brightness being a set default brightness is being scrolled. For example, "content A" and "content B" have been displayed on the touch screen of the electronic device, and the electronic device can sense a motion of scrolling up so as to display contents that are currently unseen on the touch screen because being located at the lower side of the touch screen of the electronic device. After that, the electronic device can detect a movement speed of the contents being scrolled and concurrently, sequentially display at least one content that is currently unseen on the touch screen because being located at the lower side of the touch screen of the electronic device. For example, if the electronic device senses the motion of scrolling up, the electronic device can display on the touch screen "content C" that is currently unseen on the touch screen because being located at the lower side of the touch screen of the electronic device.

Figure 5B:
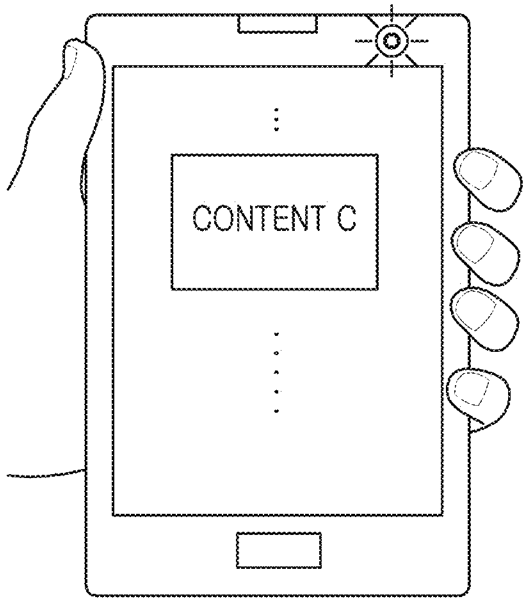

After that, as illustrated in FIG. 5B, the electronic device can detect the movement speed of the contents being scrolled and, If the detected movement speed is determined as being equal to or greater than a set speed, the electronic device can drive a camera module to capture an image in a set direction. In detail, the electronic device can detect the movement speed of the at least one content being scrolled and, if the detected movement speed of the at least one content is determined as being equal to or greater than the set speed, the electronic device can drive the camera module to capture an image in the set direction. For example, assume that the set movement speed is equal to "V2", and the set direction is a front portion of the electronic device. In the aforementioned assumption, if a movement speed of "content C" being scrolled is detected equal to or greater than the set speed "V2" in the electronic device, the electronic device can capture an image in the front being the set direction. If a set part is not included in the image captured by the electronic device, the electronic device can determine whether it senses a variation of a set pressure from at least one grip sensor provided in a set portion.

Figure 5C:
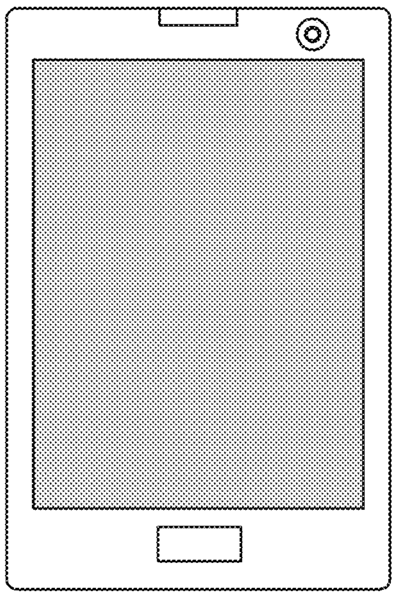

As illustrated in FIG. 5C, if the variation of pressure sensed in the electronic device is equal to or is greater than a set variation, the electronic device can change the brightness of the screen having been displayed at the first brightness, into a second brightness. In detail, if the variation of pressure sensed in the at least one grip sensor provided in the set portion is equal to or is greater than the set variation, the electronic device can change the brightness of the screen having been displayed at the first brightness being the set default brightness, into the second brightness being the set darkest brightness. That is, there may be a case where, although an image is captured in the set direction using the camera module in the electronic device, the set part may not be included in the image captured by the electronic device. If the user feels eyestrain due to at least one content being scrolled, he/she enables the grip sensors provided at the left side and right side of the electronic device to sense the variation of pressure equal to or greater than the set variation, thereby being capable of adjusting the brightness of the screen.

Figure 5D:
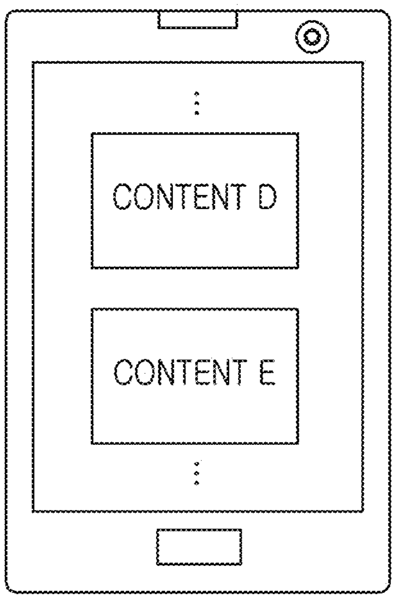

After that, as illustrated in FIG. 5D, the electronic device can change the brightness of the screen from the second brightness to the first brightness according to the changing movement speed of the contents being scrolled. First, the electronic device can sense the changing movement speed of the contents being scrolled, and identify that the sensed movement speed of the contents corresponds to any one speed level among set at least two or more speed levels. For example, assume that "brightness A" denotes the second brightness set as the lowest brightness in the electronic device, and "brightness B" denotes brightness set as a higher brightness, and "brightness C" denotes the first brightness being a default brightness set as a much higher brightness. Also, assume that "V2" denotes a set speed for giving a dimming effect to the brightness of the screen in the electronic device. Also, assume that, while displaying at least one content at the originally set default brightness "brightness C", the electronic device senses that the displayed content is being scrolled at the set speed "V2" or more. Also, assume that the electronic device senses a variation of pressure equal to or greater than a set pressure from the grip sensors provided at the left side and right side of the electronic device. Also, assume that a first speed level corresponding to "brightness C" is set to a movement speed of contents between 0 and V1, and a second speed level corresponding to "brightness B" is set to a movement speed of contents between V1 and V2, and a third speed level corresponding to "brightness A" is set to a movement speed of contents of V2 or more. In the aforementioned assumption, the electronic device can sense the changing movement speed of the contents being scrolled, and identify that the sensed movement speed of the contents corresponds to the third speed level.

Next, the electronic device can change the brightness of the screen into any one brightness of the screen matching to the identified speed level among the set at least two or more brightness of the screen. In detail, if the electronic device senses a motion of scrolling in any direction and scrolls at least one content, a speed of scrolling the at least one content may decrease as time goes. In the aforementioned example, the electronic device can identify that the initially sensed movement speed of contents corresponds to the third speed level, and change the brightness of the screen into the second brightness, i.e., "brightness A" matching to the third speed level. Next, the electronic device can identify that a movement speed of contents sensed after the lapse of a predetermined time corresponds to the second speed level, and change the brightness of the screen into "brightness B" matching to the second speed level. After that, if a scrolling status of contents is a stop status, the electronic device can change the brightness of the screen into the first brightness, i.e., "brightness C" matching to the first speed level and display "content D" and "content E". In detail, when a scrolling status of at least one content being scrolled in the electronic device is a stop status, the electronic device can change the brightness of the screen into the first brightness being the originally set default brightness. For example, in a case where there is no screen scrollable at the top or bottom of a contents page of the electronic device, in a case where a scrolling speed becomes '0' and thus a scrolling status is a stop status, in a case where the electronic device senses a new touch input, and in a case where the electronic device senses a hovering input approaching the screen, the electronic device can change the brightness of the screen into the first brightness being the originally set default brightness.

FIGS. 6A to 6D are diagrams illustrating an embodiment of automatically adjusting a brightness of a screen by using an illumination sensor and a camera module according to an embodiment of the present disclosure.

Figure 6A:
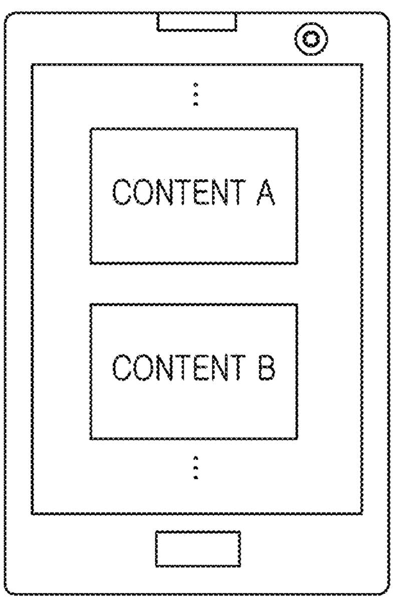
FIGS. 6A, 6B, 6C, and 6 D are diagrams illustrating an embodiment of automatically adjusting a brightness of a screen by using an illumination sensor and a camera module according to an embodiment of the present disclosure.

First, as illustrated in FIG. 6A, in a state of displaying a screen being scrolled at a first brightness, the electronic device can measure the surrounding brightness of the electronic device. In detail, in a state of displaying the screen being scrolled at the first brightness being a set default brightness, the electronic device can determine if the surrounding brightness is sensed as being equal to or greater than a set brightness by using the illumination sensor provided in the electronic device. For example, in a state of scrolling "content A" and "content B" on a touch screen, the electronic device can determine whether the surrounding brightness is sensed as being equal to or greater than the set brightness by using the illumination sensor provided in the electronic device.

Figure 6B:
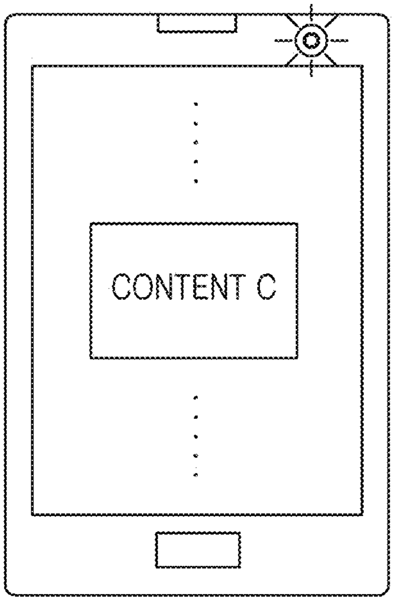
Figure 6C:
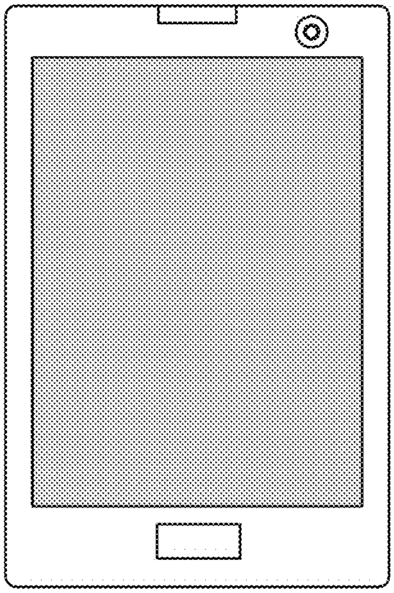

After that, as illustrated in FIG. 6B and FIG. 6C, if the surrounding brightness sensed in the electronic device is equal to or is greater than the set brightness, the electronic device can drive a camera module to capture an image in a set direction. In detail, the electronic device can detect a movement speed of at least one content being scrolled and, if the detected movement speed is determined as being equal to or greater than a set speed, the electronic device can drive the camera module to capture an image in the set direction. For example, assume that the set movement speed is equal to "V2", and the set direction is a front portion of the electronic device. In the aforementioned assumption, if a movement speed of "content C" being scrolled is detected equal to or greater than the set speed "V2" in the electronic device, the electronic device can capture an image in the front being the set direction. If a set part is included in the image captured by the electronic device, when a variation of the set part is determined as being equal to or greater than a set variation, the electronic device can change the brightness of the screen having been displayed at the first brightness being the set default brightness, into a second brightness being the set darkest brightness.

But, if the surrounding brightness sensed in the electronic device is not equal to or is not greater than the set brightness, the electronic device can determine whether displayed contents are being scrolled. If it is determined that the displayed contents are being scrolled in the electronic device, the electronic device can detect a movement speed of the contents being scrolled and determine whether the detected movement speed is equal to or is greater than a set speed. If the detected movement speed is determined as being equal to or greater than the set speed in the electronic device, the electronic device can drive the camera module to capture an image in the set direction. In detail, the electronic device can detect a movement speed of at least one content being scrolled and, if the detected movement speed is determined as being equal to or greater than the set speed, the electronic device can drive the camera module to capture an image in the set direction. For example, assume that the set movement speed is equal to "V2", and the set direction is a front portion of the electronic device. In the aforementioned assumption, if a movement speed of "content C" being scrolled is detected equal to or greater than the set speed "V2" in the electronic device, the electronic device can capture an image with the front being the set direction. If a set part is included in the image captured by the electronic device, when a variation of the set part is determined as being equal to or greater than a set variation, the electronic device can change the brightness of the screen having been displayed at the first brightness being the set default brightness, into the second brightness being the set darkest brightness.

Figure 6D:
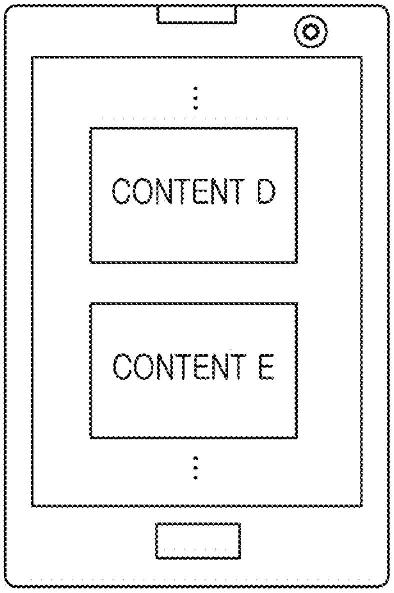

After that, as illustrated in FIG. 6D, the electronic device can change the brightness of the screen from the second brightness to the first brightness according to the changing movement speed of the contents being scrolled. First, the electronic device can sense the changing movement speed of the contents being scrolled, and identify that the sensed movement speed of the contents corresponds to any one speed level among set at least two or more speed levels. For example, assume that "brightness A" denotes the second brightness set as the lowest brightness in the electronic device, and "brightness B" denotes brightness set as a higher brightness, and "brightness C" denotes the first brightness being a default brightness set as a much higher brightness.

Also, assume that "V2" denotes a set speed for giving a dimming effect to the brightness of the screen in the electronic device. Also, assume that, while displaying at least one content at the originally set default brightness "brightness C", the electronic device senses that the displayed content is being scrolled at the set speed "V2" or more. Also, assume that the result of capturing an image in the set direction in the electronic device is that the set part is not included in the captured image. Also, assume that a first speed level corresponding to "brightness C" is set to a movement speed of contents between 0 and V1, and a second speed level corresponding to "brightness B" is set to a movement speed of contents between V1 and V2, and a third speed level corresponding to "brightness A" is set to a movement speed of contents of V2 or more. In the aforementioned assumption, the electronic device can sense the changing movement speed of the contents being scrolled, and identify that the sensed movement speed of the contents corresponds to the third speed level.

Next, the electronic device can change the brightness of the screen into any one brightness of the screen matching to the identified speed level among the set at least two or more brightness of the screen. In detail, if the electronic device senses a motion of scrolling in any direction and scrolls at least one content, a speed of scrolling the at least one content may decrease as time goes. In the aforementioned example, the electronic device can identify that the initially sensed movement speed of contents corresponds to the third speed level, and change the brightness of the screen into the second brightness, i.e., "brightness A" matching to the third speed level. Next, the electronic device can identify that a movement speed of contents sensed after the lapse of a predetermined time corresponds to the second speed level, and change the brightness of the screen into "brightness B" matching to the second speed level. After that, if a scrolling status of contents is a stop status, the electronic device can change the brightness of the screen into the first brightness, i.e., "brightness C" matching to the first speed level and display "content D" and "content E". In detail, when a scrolling status of at least one content being scrolled in the electronic device is a stop status, the electronic device can change the brightness of the screen into the first brightness being the originally set default brightness. For example, in a case where there is no screen scrollable at the top or bottom of a contents page of the electronic device, in a case where a scrolling speed becomes '0' and thus a scrolling status is a stop status, in a case where the electronic device senses a new touch input, and in a case where the electronic device senses a hovering input approaching the screen, the electronic device can change the brightness of the screen into the first brightness being the originally set default brightness.

FIGS. 7A to 7D are diagrams illustrating an embodiment of automatically adjusting a brightness of a screen by using an illumination sensor and a grip sensor according to an embodiment of the present disclosure.

Figure 7A:
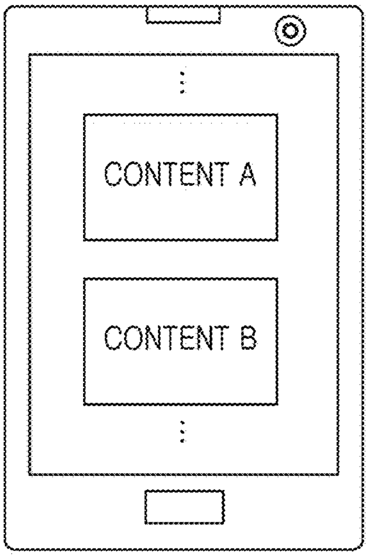
FIGS. 7A, 7B, 7C, and 7D are diagrams illustrating an embodiment of automatically adjusting a brightness of a screen by using an illumination sensor and a grip sensor according to an embodiment of the present disclosure.

First, as illustrated in FIG. 7A, in a state of displaying a screen being scrolled at a first brightness, the electronic device can measure the surrounding brightness of the electronic device. In detail, in a state of displaying the screen being scrolled at the first brightness being a set default brightness, the electronic device can determine if the surrounding brightness is sensed as being equal to or greater than a set brightness by using the illumination sensor provided in the electronic device. For example, in a state of scrolling "content A" and "content B" on a touch screen, the electronic device can determine whether the surrounding brightness is sensed as being equal to or greater than the set brightness by using the illumination sensor provided in the electronic device.

Figure 7B:
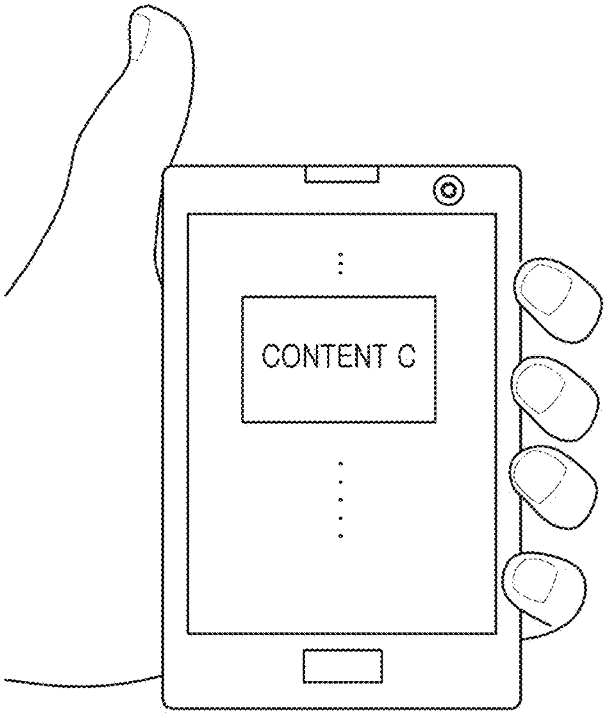
Figure 7C:
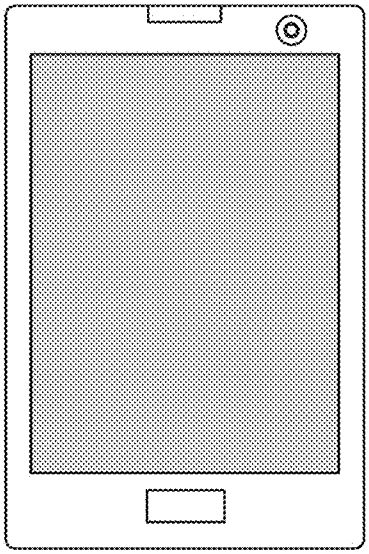

After that, as illustrated in FIG. 7B and FIG. 7C, the electronic device can change the brightness of the screen having been displayed at the first brightness, into the second brightness depending on whether the sensed surrounding brightness is equal to or is greater than the set brightness. First, if the surrounding brightness sensed in the electronic device is equal to or is greater than the set brightness, the electronic device can determine whether it senses a variation of pressure equal to or greater than a set variation from at least one grip sensor provided in a set portion. If the electronic device senses the variation of pressure equal to or greater than the set variation from the grip sensor, the electronic device can change the brightness of the screen having been displayed at the first brightness being the set default brightness, into the second brightness being the set darkest brightness. That is, if the user feels eyestrain due to at least one content being scrolled, he/she enables the grip sensors provided at the left side and right side of the electronic device to sense the variation of pressure equal to or greater than the set variation, thereby being capable of adjusting the brightness of the screen.

But, if the surrounding brightness sensed in the electronic device is not equal to or is not greater than the set brightness, the electronic device can determine whether displayed contents are being scrolled. If it is determined that the displayed contents are being scrolled in the electronic device, the electronic device can sense whether there is a variation of pressure from at least one grip sensor provided in a set portion. If the variation of pressure sensed in the electronic device is equal to or is greater than a set variation, the electronic device can change the brightness of the screen having been displayed at the first brightness, into the second brightness. In detail, if the variation of pressure sensed in the at least one grip sensor provided in the set portion is equal to or is greater than the set variation, the electronic device can change the brightness of the screen from the first brightness being the set default brightness to the second brightness being the set darkest brightness.

Figure 7D:
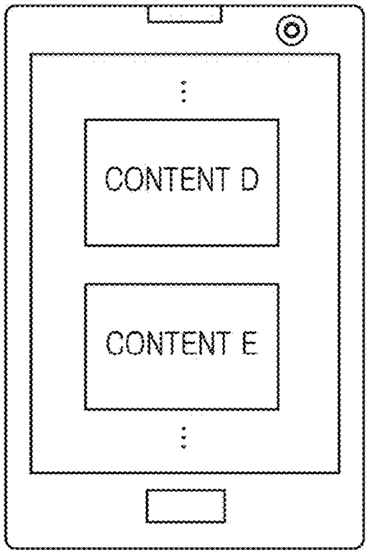

After that, as illustrated in FIG. 7D, the electronic device can change the brightness of the screen from the second brightness to the first brightness according to the changing movement speed of the contents being scrolled. First, the electronic device can sense the changing movement speed of the contents being scrolled, and identify that the sensed movement speed of the contents corresponds to any one speed level among set at least two or more speed levels. For example, assume that "brightness A" denotes the second brightness set as the lowest brightness in the electronic device, and "brightness B" denotes brightness set as a higher brightness, and "brightness C" denotes the first brightness being a default brightness set as a much higher brightness. Also, assume that "V2" denotes a set speed for giving a dimming effect to the brightness of the screen in the electronic device. Also, assume that, while displaying at least one content at the originally set default brightness "brightness C", the electronic device senses that the displayed content is being scrolled at the set speed "V2" or more. Also, assume that the electronic device senses a variation of pressure equal to or greater than a set pressure from grip sensors provided at the left side and right side of the electronic device. Also, assume that a first speed level corresponding to "brightness C" is set to a movement speed of contents between 0 and V1, and a second speed level corresponding to "brightness B" is set to a movement speed of contents between V1 and V2, and a third speed level corresponding to "brightness A" is set to a movement speed of contents of V2 or more. In the aforementioned assumption, the electronic device can sense the changing movement speed of the contents being scrolled, and identify that the sensed movement speed of the contents corresponds to the third speed level.

Next, the electronic device can change the brightness of the screen into any one brightness of the screen matching to the identified speed level among the set at least two or more brightness of the screen. In detail, if the electronic device senses a motion of scrolling in any direction and scrolls at least one content, a speed of scrolling the at least one content may decrease as time goes. In the aforementioned example, the electronic device can identify that the initially sensed movement speed of contents corresponds to the third speed level, and change the brightness of the screen into the second brightness, i.e., "brightness A" matching to the third speed level. Next, the electronic device can identify that a movement speed of contents sensed after the lapse of a predetermined time corresponds to the second speed level, and change the brightness of the screen into "brightness B" matching to the second speed level. After that, if a scrolling status of contents is a stop status, the electronic device can change the brightness of the screen into the first brightness, i.e., "brightness C" matching to the first speed level and display "content D" and "content E". In detail, when a scrolling status of at least one content being scrolled in the electronic device is a stop status, the electronic device can change the brightness of the screen into the first brightness being the originally set default brightness. For example, in a case where there is no screen scrollable at the top or bottom of a contents page of the electronic device, in a case where a scrolling speed becomes '0' and thus a scrolling status is a stop status, in a case where the electronic device senses a new touch input, and in a case where the electronic device senses a hovering input approaching the screen, the electronic device can change the brightness of the screen into the first brightness being the originally set default brightness.

FIGS. 8A to 8E are diagrams illustrating an embodiment of automatically adjusting a brightness of a screen by using an illumination sensor, a camera module, and a grip sensor according to an embodiment of the present disclosure.

Figure 8A:
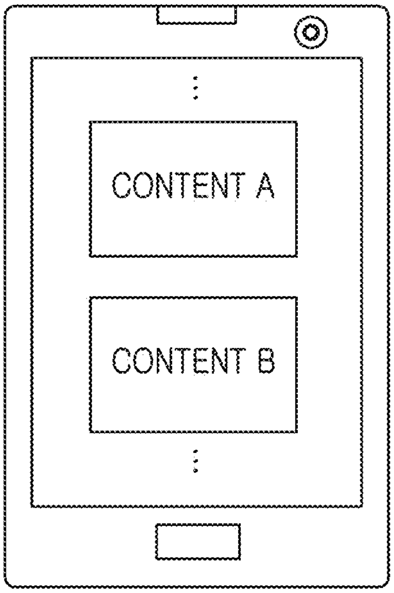
FIGS. 8A, 8B, 8C, 8D, and 8E are diagrams illustrating an embodiment of automatically adjusting a brightness of a screen by using an illumination sensor, a camera module, and a grip sensor according to an embodiment of the present disclosure.

First, as illustrated in FIG. 8A, in a state of displaying a screen being scrolled at a first brightness, the electronic device can measure the surrounding brightness of the electronic device. In detail, in a state of displaying the screen being scrolled at the first brightness being a set default brightness, the electronic device can determine if the surrounding brightness is sensed as being equal to or greater than a set brightness by using the illumination sensor provided in the electronic device. For example, in a state of scrolling "content A" and "content B" on a touch screen, the electronic device can determine whether the surrounding brightness is sensed as being equal to or greater than the set brightness by using the illumination sensor provided in the electronic device.

Figure 8B:
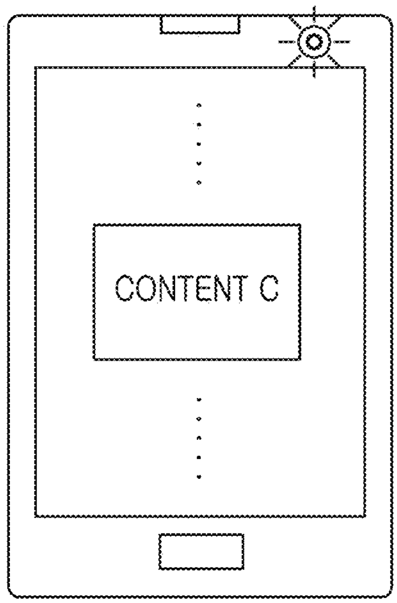
Figure 8C:
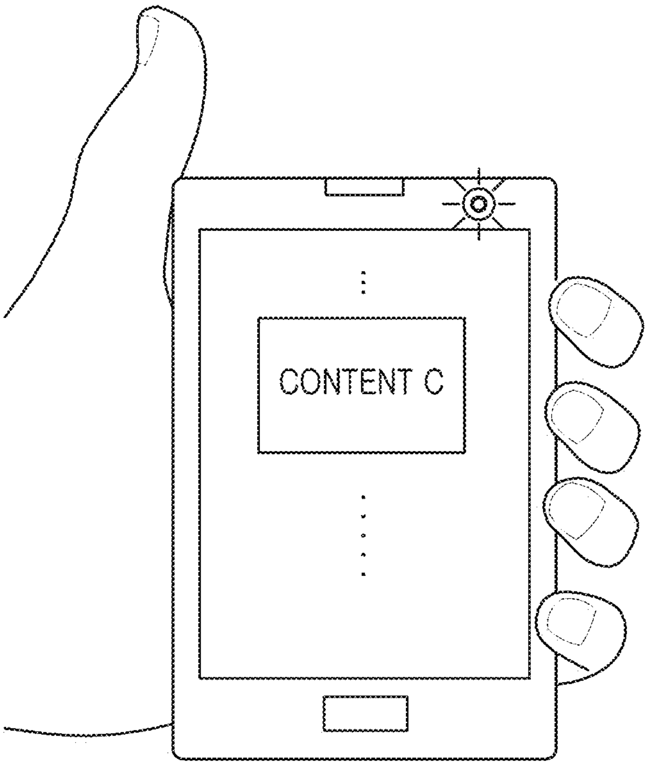
Figure 8D:
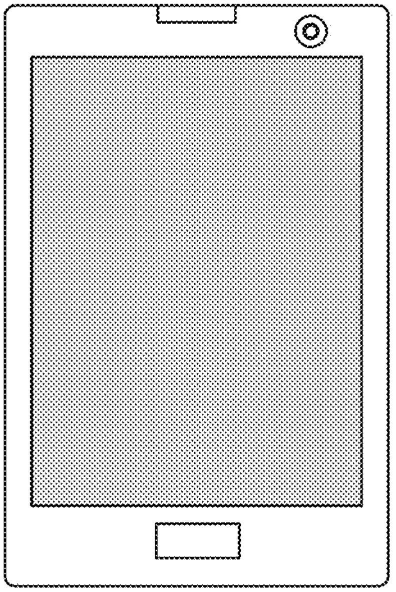

After that, as illustrated in FIG. 8B, FIG. 8C and FIG. 8D, the electronic device can change the brightness of the screen having been displayed at the first brightness, into a second brightness depending on whether the sensed surrounding brightness is equal to or is greater than the set brightness. First, if the surrounding brightness sensed in the electronic device is equal to or is greater than the set brightness, the electronic device can drive a camera module to capture an image in a set direction. For example, assume that the direction set in the electronic device is a front portion of the electronic device. In the aforementioned assumption, in a state where "content C" is being scrolled in the electronic device, the electronic device can capture an image in a front being the set direction. If a set part is not included in the image captured by the electronic device, the electronic device can determine whether it senses a variation of pressure equal to or greater than a set variation from at least one grip sensor provided in a set portion. If the electronic device senses the variation of pressure equal to or greater than the set variation from the grip sensor, the electronic device can change the brightness of the screen having been displayed at the first brightness being the set default brightness, into the second brightness being the set darkest brightness. That is, if the user feels eyestrain due to at least one content being scrolled, he/she enables the grip sensors provided at the left side and right side of the electronic device to sense the variation of pressure equal to or greater than the set variation, thereby being capable of adjusting the brightness of the screen.

But, if the surrounding brightness sensed in the electronic device is not equal to or is not greater than the set brightness, the electronic device can determine whether displayed contents are being scrolled. If it is determined that the displayed contents are being scrolled in the electronic device, the electronic device can drive the camera module to capture an image in the set direction. For example, assume that "content C" is being scrolled on a touch screen of the electronic device, and the direction set in the electronic device is a front portion of the electronic device. In the aforementioned assumption, in a state where "content C" is being scrolled in the electronic device, the electronic device can capture an image in the front being the set direction. If the set part is not included in the image captured by the electronic device, the electronic device can determine whether it senses a variation of pressure equal to or greater than a set variation from at least one grip sensor provided in a set portion. If the electronic device senses the variation of pressure equal to or greater than the set variation from the grip sensor, the electronic device can change the brightness of the screen having been displayed at the first brightness being the set default brightness, into the second brightness being the set darkest brightness. That is, there is an advantage that the electronic device senses user's eyestrain from at least one sensor by using the illumination sensor, camera module, and grip sensor provided in the electronic device, improving a user's convenience.

Figure 8E:
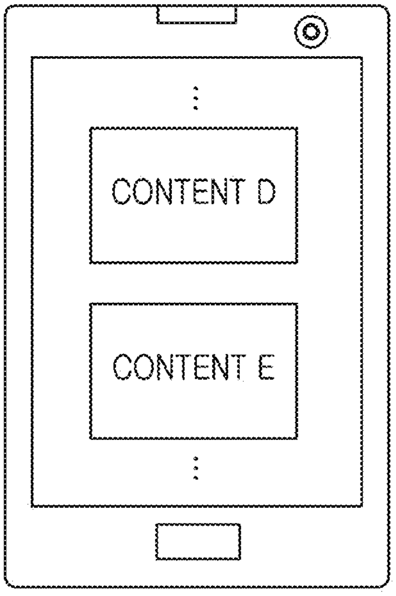

After that, as illustrated in FIG. 8E, the electronic device can change the brightness of the screen from the second brightness to the first brightness according to the changing movement speed of the contents being scrolled. First, the electronic device can sense the changing movement speed of the contents being scrolled, and identify that the sensed movement speed of the contents corresponds to any one speed level among set at least two or more speed levels. For example, assume that "brightness A" denotes the second brightness set as the lowest brightness in the electronic device, and "brightness B" denotes brightness set as a higher brightness, and "brightness C" denotes the first brightness being a default brightness set as a much higher brightness. Also, assume that "V2" denotes a set speed for giving a dimming effect to the brightness of the screen in the electronic device. Also, assume that, while displaying at least one content at the originally set default brightness "brightness C", the electronic device senses that the displayed content is being scrolled at the set speed "V2" or more. Also, assume that the result of capturing an image in the set direction in the electronic device is that a set part is not included in the captured image and thus the electronic device senses a variation of pressure equal to or greater than a set pressure from grip sensors provided at the left side and right side of the electronic device. Also, assume that a first speed level corresponding to "brightness C" is set to a movement speed of contents between 0 and V1, and a second speed level corresponding to "brightness B" is set to a movement speed of contents between V1 and V2, and a third speed level corresponding to "brightness A" is set to a movement speed of contents of V2 or more. In the aforementioned assumption, the electronic device can sense the changing movement speed of the contents being scrolled, and identify that the sensed movement speed of the contents corresponds to the third speed level.

Next, the electronic device can change the brightness of the screen into any one brightness of the screen matching to the identified speed level among the set at least two or more brightness of the screen. In detail, if the electronic device senses a motion of scrolling in any direction and scrolls at least one content, a speed of scrolling the at least one content may decrease as time goes. In the aforementioned example, the electronic device can identify that the initially sensed movement speed of contents corresponds to the third speed level, and change the brightness of the screen into the second brightness, i.e., "brightness A" matching to the third speed level. Next, the electronic device can identify that a movement speed of contents sensed after the lapse of a predetermined time corresponds to the second speed level, and change the brightness of the screen into "brightness B" matching to the second speed level. After that, if a scrolling status of contents is a stop status, the electronic device can change the brightness of the screen into the first brightness, i.e., "brightness C" matching to the first speed level and display "content D" and "content E". In detail, when a scrolling status of at least one content being scrolled in the electronic device is a stop status, the electronic device can change the brightness of the screen into the first brightness being the originally set default brightness. For example, in a case where there is no screen scrollable at the top or bottom of a contents page of the electronic device, in a case where a scrolling speed becomes '0' and thus a scrolling status is a stop status, in a case where the electronic device senses a new touch input, and in a case where the electronic device senses a hovering input approaching the screen, the electronic device can change the brightness of the screen into the first brightness being the originally set default brightness.

Figure 9:
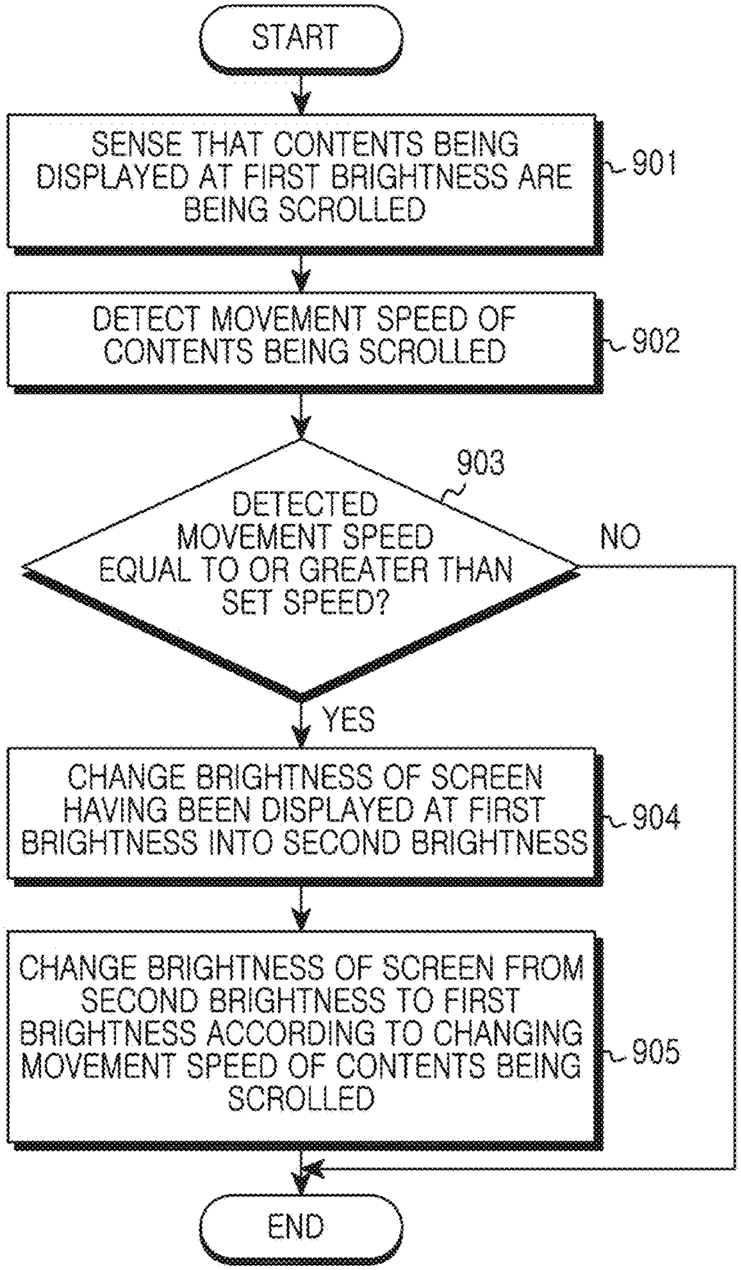
FIG. 9 is a flowchart illustrating a procedure of automatically adjusting a brightness of a screen in an electronic device according to an embodiment of the present disclosure.

FIG. 9 is a flowchart illustrating a procedure of automatically adjusting a brightness of a screen in an electronic device according to an embodiment of the present disclosure.

First, as illustrated in FIG. 9, at operation 901 the electronic device can sense that contents being displayed at a first brightness are being scrolled. Here, the first brightness can be defined as a set default brightness. In detail, the electronic device can sense that at least one content being displayed on a touch screen at the first brightness being the set default brightness is being scrolled. For example, "content A" and "content B" have been displayed on the touch screen of the electronic device, and the electronic device can sense a motion of scrolling up so as to display contents that are currently unseen on the touch screen because being located at the lower side of the touch screen of the electronic device.

At operation 902, the electronic device sensing that the content being displayed at the first brightness is being scrolled can detect a movement speed of the content being scrolled. For example, if the electronic device senses the motion of scrolling up, the electronic device can display on the touch screen "content C", "content D", etc. being at least one content that is currently unseen on the touch screen because being located at the lower side of the touch screen of the electronic device and concurrently, detect a movement speed of the content being scrolled.

Next, at operation 903, the electronic device can determine if the detected movement speed is equal to or is greater than a set speed. For example, if two contents "content C" and "content D" are being scrolled on the touch screen of the electronic device, the electronic device can detect a movement speed of the two contents being scrolled, and determine whether the detected movement speed is equal to or is greater than the set speed.

If the detected movement speed is determined as being equal to or greater than the set speed in the electronic device, at operation 904, the electronic device can change the brightness of the screen having been displayed at the first brightness, into a second brightness. For example, assume that "V1" denotes a speed set in the electronic device. In the aforementioned assumption, if the detected movement speed is determined as being equal to or greater than the set speed "V1" as the result of detecting the movement speed of at least one content being scrolled in the electronic device, the electronic device can change the brightness of the screen from the first brightness being a set default brightness to the second brightness being the set darkest brightness.

Next, at operation 905, the electronic device can change the brightness of the screen from the second brightness to the first brightness according to the changing movement speed of the contents being scrolled. In detail, the electronic device can change the brightness of the screen into any one brightness of the screen matching to an identified speed level among set at least two or more brightness of the screen. That is, because the movement speed of the contents being scrolled decreases gradually as time goes in the electronic device, the electronic device can automatically change the brightness of the screen according to each movement speed of contents. Finally, if a scrolling status of contents is a stop status, the electronic device can change the brightness of the screen into the first brightness being the set default brightness. Accordingly, there is an advantage that the electronic device decreases user's eyestrain by automatically adjusting the brightness of the screen according to a scrolling speed of contents being displayed on the touch screen. If the detected movement speed is not determined as being equal to or greater than the set speed in the electronic device in the aforementioned assumption of operation 903, the procedure of automatically adjusting the brightness of the screen is terminated at once.

Figure 10:
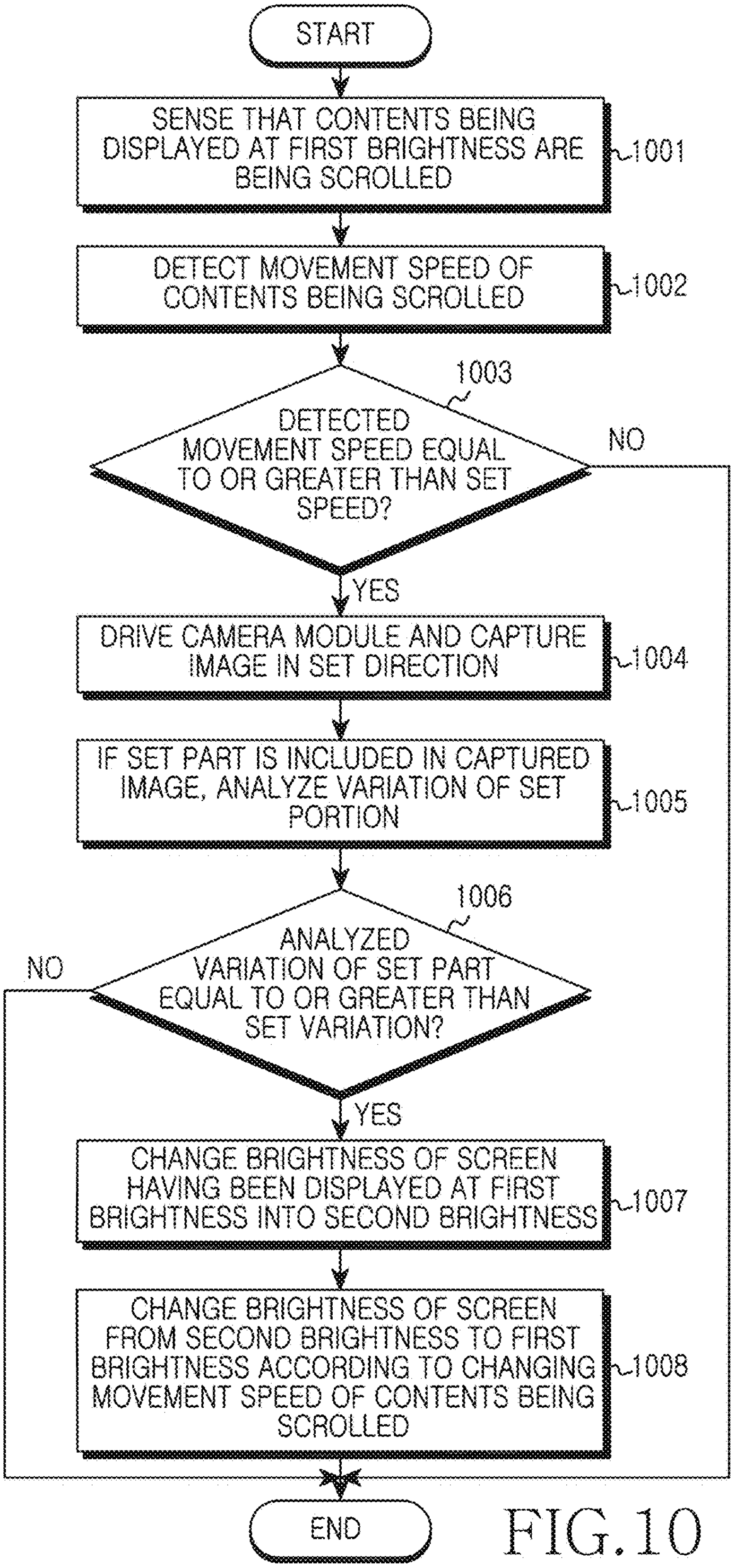
FIG. 10 is a flowchart illustrating a procedure of automatically adjusting a brightness of a screen by using a camera module according to an embodiment of the present disclosure.

FIG. 10 is a flowchart illustrating a procedure of automatically adjusting a brightness of a screen by using a camera module according to an embodiment of the present disclosure.

First, at operation 1001, an electronic device can sense that contents being displayed at a first brightness are being scrolled. Here, the first brightness can be defined as a set default brightness. In detail, the electronic device can sense that at least one content being displayed on a touch screen at the first brightness being the set default brightness is being scrolled. For example, "content A" and "content B" have been displayed on the touch screen of the electronic device, and the electronic device can sense a motion of scrolling up so as to display contents that are currently unseen on the touch screen because being located at the lower side of the touch screen of the electronic device.

At operation 1002, the electronic device sensing that the contents being displayed at the first brightness are being scrolled can detect a movement speed of the contents being scrolled. For example, if the electronic device senses the motion of scrolling up, the electronic device can display on the touch screen "content C", "content D", etc. being at least one content that is currently unseen on the touch screen because being located at the lower side of the touch screen of the electronic device and concurrently, detect a movement speed of the content being scrolled.

Next, at operation 1003, the electronic device can determine if the detected movement speed is equal to or is greater than a set speed. For example, if two contents "content C" and "content D" are being scrolled on the touch screen of the electronic device, the electronic device can detect a movement speed of the two contents being scrolled, and determine whether the detected movement speed is equal to or is greater than the set speed.

If the detected movement speed is determined as being equal to or greater than the set speed in the electronic device, at operation 1004, the electronic device can drive a camera module to capture an image in a set direction. In detail, the electronic device can detect a movement speed of at least one content being scrolled and, if the detected movement speed of the at least one content is determined as being equal to or greater than the set speed, the electronic device can drive the camera module to capture an image in the set direction. For example, assume that the set movement speed is equal to "V2", and the set direction is a front portion of the electronic device. In the aforementioned assumption, if a movement speed of "content C" and "content D" being scrolled is detected equal to or greater than the set speed "V2" in the electronic device, the electronic device can capture an image with the front being the set direction.

Next, if a set part is included in the captured image, at operation 1005, the electronic device analyzes a variation of the set part. Here, the set part can be at least one part among the pupil of a human, eyebrows, and a distance between the eyebrows. In detail, if it is determined that at least one part among the set parts, which are the pupil of a human, the eyebrows, and the distance between the eyebrows, is included in the captured image as the result of capturing an image in the set direction in the electronic device, the electronic device can analyze the variation of the set part.

At operation 1006, the electronic device analyzing the variation of the set part can determine if the analyzed variation of the set part is equal to or is greater than a set variation. In detail, the electronic device can determine if the analyzed variation of the pupil of the user, the eyebrows, the distance between the eyebrows and the like is equal to or is greater than the set variation. For example, if a movement speed of at least one content being scrolled is detected equal to or greater than a set speed in the electronic device, the electronic device can capture an image in the set direction and determine whether the variation of the pupil being the set part included in the captured image is equal to or is greater than the set variation. This is for determining whether the user is feeling his/her eyestrain by means of a variation of a size of the pupil in the electronic device, because the size of the pupil of a human can increase when the surrounding brightness is suddenly changed brighter.

If the analyzed variation of the set part is determined as being equal to or greater than the set variation in the electronic device, at operation 1007, the electronic device can change the brightness of the screen having been displayed at the first brightness, into a second brightness. In detail, if the variation of the set part is determined as being equal to or greater than the set variation, the electronic device can change the brightness of the screen from the first brightness being the original default brightness to the second brightness being the set lowest brightness. Accordingly, there is an advantage of reducing the occurrence of eyestrain caused by a color of at least one content when the user opens at least one content of different color and size scrolled and moved on the touch screen of the electronic device.

After that, at operation 1008, the electronic device can change the brightness of the screen from the second brightness to the first brightness according to the changing movement speed of the contents being scrolled. In detail, the electronic device can change the brightness of the screen into any one brightness of the screen matching to an identified speed level among set at least two or more brightness of the screen. That is, because the movement speed of contents being scrolled decreases gradually as time goes in the electronic device, the electronic device can automatically change the brightness of the screen according to each movement speed of contents. Finally, if a scrolling status of contents is a stop status, the electronic device can change the brightness of the screen into the first brightness being the set default brightness.

If the detected movement speed is not determined as being equal to or greater than the set speed in the electronic device in the aforementioned determination process of operation 1003 or if the analyzed variation of the set part is not determined as being equal to or greater than the set variation in the aforementioned determination process of operation 1006, the procedure of automatically adjusting the brightness of the screen is terminated at once.

Figure 11:
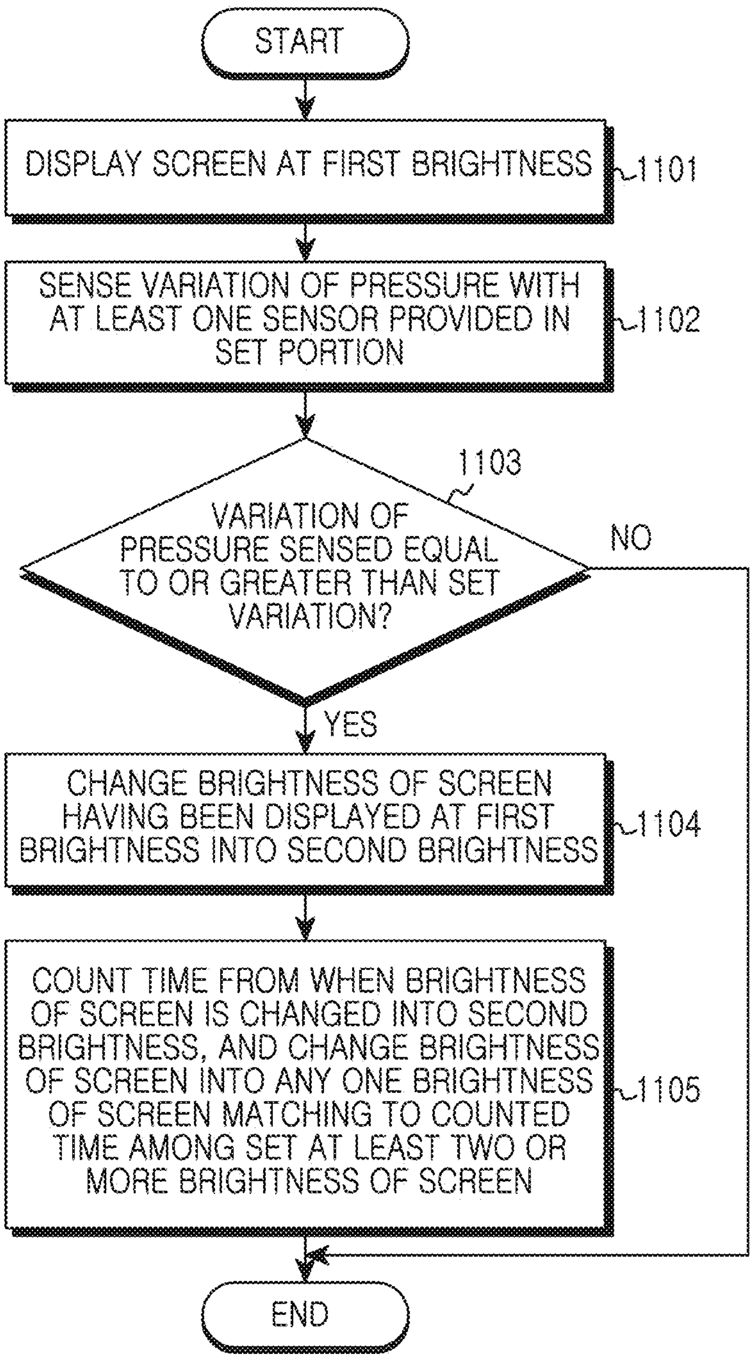
FIG. 11 is a flowchart illustrating an embodiment of automatically changing a brightness of a screen by using a grip sensor according to an embodiment of the present disclosure.

FIG. 11 is a flowchart illustrating an embodiment of automatically changing a brightness of a screen by using a grip sensor according to an embodiment of the present disclosure.

First, as illustrated in FIG. 11, at operation 1101, an electronic device can display a screen at a first brightness. In detail, the electronic device can display the screen at the first brightness being a set default brightness.

At operation 1102, the electronic device displaying the screen at the first brightness being the originally set default brightness can sense a variation of pressure with at least one sensor provided in a set portion. In detail, the electronic device can provide grip sensors at the left and right portions of the electronic device to sense a variation of varying pressure. Undoubtedly, the electronic device may provide the grip sensors at the upper and lower portions of the electronic device as well as the left side and right side of the electronic device to sense the variation of pressure.

Next, at operation 1103, the electronic device can determine whether the variation of pressure is sensed as being equal to or greater than a set variation. In detail, the electronic device can determine whether the variation of pressure sensed using the grip sensor provided in the set portion is equal to or is greater than the set variation. For example, if a user more applies force to the electronic device and makes a motion of gripping the electronic device, the electronic device can identify that the variation of pressure is sensed as being equal to or greater than the set variation. In the same meaning, if the user makes a motion of decreasing a force of gripping the electronic device, the electronic device can identify that the variation of pressure is sensed as being equal to or greater than the set variation.

If the variation of pressure is sensed as being equal to or greater than the set variation in the electronic device, at operation 1104, the electronic device can change the brightness of the screen having been displayed at the first brightness, into a second brightness. In detail, if the electronic device senses the variation of pressure equal to or greater than the set variation from the at least one grip sensor provided in the set portion, the electronic device can change the brightness of the screen having been displayed at the first brightness being the set default brightness, into the second brightness being the set darkest brightness. For example, assume that the user makes a motion of scrolling the screen up or down in order to open a portion that is not currently displayed on a touch screen but is located at the lower side or upper side of contents. In the aforementioned assumption, if the user feels eyestrain due to at least one content being scrolled, he/she can apply more pressure than the first and makes a motion of gripping the electronic device such that the grip sensors provided at the left side and right side of the electronic device can sense the variation of pressure equal to or greater than the set variation. That is, if the electronic device senses the variation of pressure equal to or greater than the set variation from the grip sensors, the electronic device can change the brightness of the screen from the set default brightness to the set darkest brightness.

At operation 1105, the electronic device changing the brightness of the screen from the first brightness to the second brightness can count time from the time when the brightness of the screen is changed into the second brightness, and change the brightness of the screen into any one brightness of the screen matching to the counted time among set at least two or more brightness of the screen. In detail, the electronic device can count time from the time when the brightness of the screen is changed into the set darkest brightness, and gradually change the brightness of the screen into any one brightness of the screen matching to the counted time among the set at least two or more brightness of the screen. For example, assume that the electronic device senses equal to or greater than a variation of a set pressure from the grip sensor, and changes the brightness of the screen into the set darkest brightness. Also, assume that "brightness A" is set as the brightness of the screen to a period of time of 0 second to 5 seconds, and "brightness B" is set as the brightness of the screen to a period of time of 6 seconds to 10 seconds, and "brightness C" is set as the brightness of the screen to a period of time of 11 seconds to 15 seconds. In the aforementioned assumption, the electronic device can start counting time after changing the brightness of the screen into the darkest brightness "brightness A". After that, if the time counted in the electronic device is between 0 second and 5 seconds, the electronic device can continuously maintain the changed brightness of the screen as "brightness A". Unlike this, if the time counted in the electronic device is between 6 seconds and 10 seconds, the electronic device can change the changed brightness of the screen from "brightness A" to "brightness B". Continuously, if the time counted in the electronic device exceeds 11 seconds, the electronic device can change the brightness of the screen into the originally set default brightness "brightness C". That is, if it is determined that the time counted in the electronic device exceeds 11 seconds being a set time, the electronic device can change the brightness of the screen into the originally set default brightness "brightness C". If the variation of pressure is not sensed as being equal to or greater than the set variation in the electronic device in the aforementioned determination process of operation 1103, the procedure of automatically adjusting the brightness of the screen can be terminated at once.

Figure 12:
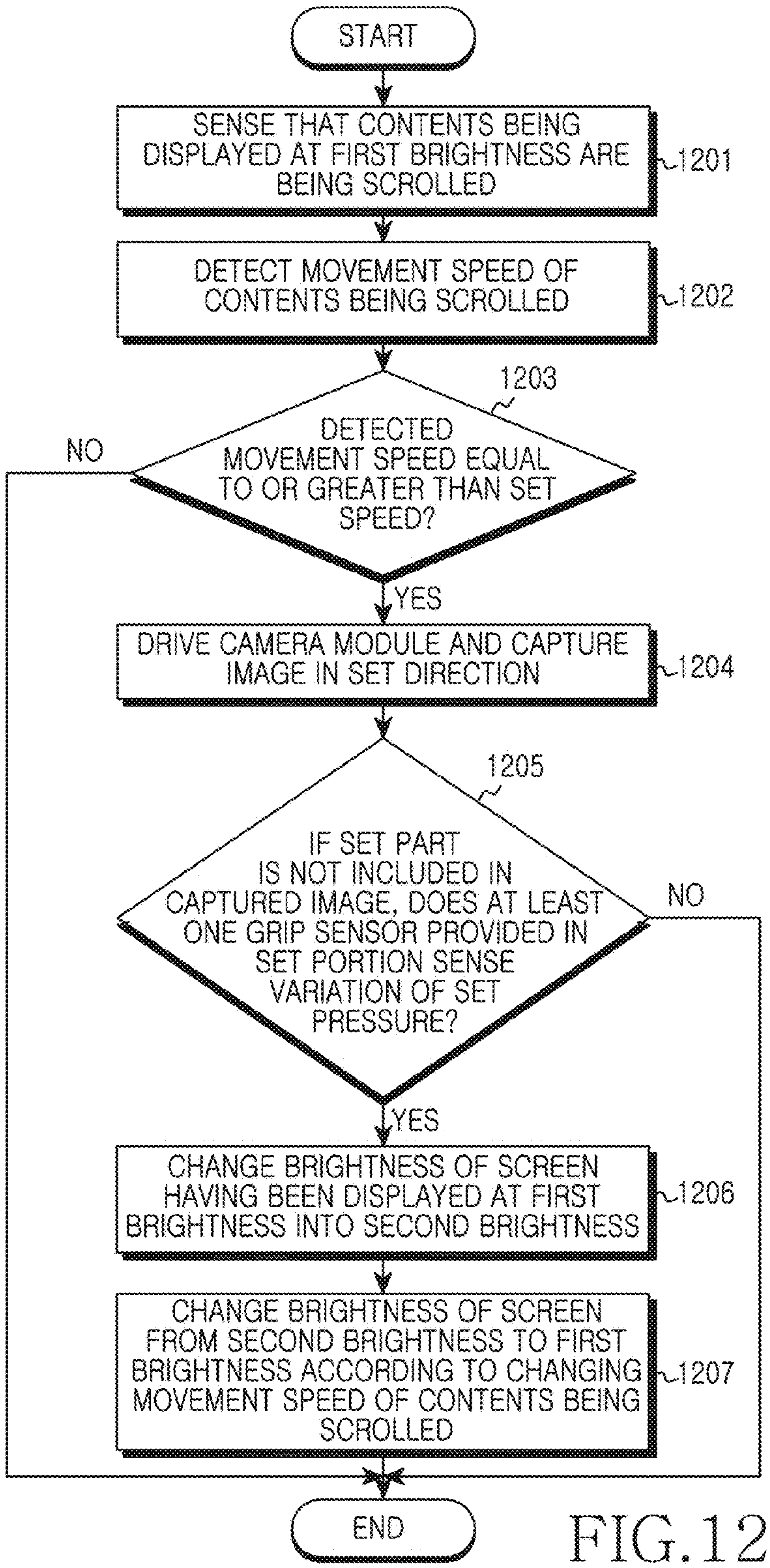
FIG. 12 is a flowchart illustrating a procedure of automatically changing a brightness of a screen by using a camera module and a grip sensor according to an embodiment of the present disclosure.

FIG. 12 is a flowchart illustrating a procedure of automatically changing a brightness of a screen by using a camera module and a grip sensor according to an embodiment of the present disclosure.

First, as illustrated in FIG. 12, at operation 1201, the electronic device can sense that contents being displayed at a first brightness are being scrolled. In detail, the electronic device can sense that at least one content being displayed on a touch screen at the first brightness being a set default brightness is being scrolled. For example, "content A" and "content B" have been displayed on the touch screen of the electronic device, and the electronic device can sense a motion of scrolling up so as to display contents that are currently unseen on the touch screen because being located at the lower side of the touch screen of the electronic device.

At operation 1202, the electronic device sensing that the content being displayed at the first brightness is being scrolled can detect a movement speed of the content being scrolled. For example, if the electronic device senses the motion of scrolling up, the electronic device can display on the touch screen "content C", "content D", etc. being at least one content that is currently unseen on the touch screen because being located at the lower side of the touch screen of the electronic device and concurrently, detect a movement speed of the content being scrolled.

Next, at operation 1203, the electronic device can determine if the detected movement speed is equal to or is greater than a set speed. For example, if two contents "content C" and "content D" are being scrolled on the touch screen of the electronic device, the electronic device can detect a movement speed of the two contents being scrolled, and determine whether the detected movement speed is equal to or is greater than the set speed.

If the detected movement speed is determined as being equal to or greater than the set speed in the electronic device, at operation 1204, the electronic device can drive a camera module to capture an image in a set direction. In detail, the electronic device can detect the movement speed of the at least one content being scrolled and, if the detected movement speed of the at least one content is determined as being equal to or greater than the set speed, the electronic device can drive the camera module to capture an image in the set direction. For example, assume that the set movement speed is equal to "V2", and the set direction is a front portion of the electronic device. In the aforementioned assumption, if a movement speed of "content C" and "content D" being scrolled is detected equal to or greater than the set speed "V2" in the electronic device, the electronic device can capture an image with the front being the set direction.

Next, if a set part is not included in the captured image, at operation 1205, the electronic device can determine whether at least one grip sensor provided in a set portion senses a variation of a set pressure. In detail, if it is determined that at least one part among the set parts, which are the pupil of a human, eyebrows, and a distance between the eyebrows, is not included in the captured image as the result of analyzing the captured image in the electronic device, the electronic device can determine whether the at least one grip sensor senses the variation of the set pressure.

If the electronic device senses the variation of the set pressure, at operation 1206, the electronic device can change the brightness of the screen having been displayed at the first brightness, into a second brightness. In detail, if the electronic device senses a variation of pressure equal to or greater than a set variation from the at least one grip sensor provided in the set portion, the electronic device can change the brightness of the screen having been displayed at the first brightness being the set default brightness, into the second brightness being the set darkest brightness. That is, there may be a case where, although an image is captured in the set direction is using the camera module in the electronic device, the set part may not be included in the image captured by the electronic device. If the user feels eyestrain due to at least one content being scrolled, he/she enables grip sensors provided at the left side and right side of the electronic device to sense the variation of pressure equal to or greater than the set variation, thereby being capable of adjusting the brightness of the screen.

Next, at operation 1207, the electronic device can change the brightness of the screen from the second brightness to the first brightness according to the changing movement speed of the contents being scrolled. In detail, the electronic device can change the brightness of the screen into any one brightness of the screen matching to an identified speed level among set at least two or more brightness of the screen. That is, because the movement speed of the contents being scrolled decreases gradually as time goes in the electronic device, the electronic device can automatically change the brightness of the screen according to each movement speed of contents. Finally, if a scrolling status of contents is a stop status, the electronic device can change the brightness of the screen into the first brightness being the set default brightness.

If the detected movement speed is not detected equal to or greater than the set speed in the electronic device in the aforementioned determination process of operation 1203 or if the set part is not included in the captured image and thus the at least one grip sensor provided in the set portion does not sense the variation of the set pressure in the aforementioned determination process of operation 1205, the procedure of automatically adjusting the brightness of the screen can be all terminated at once.

Figure 13:
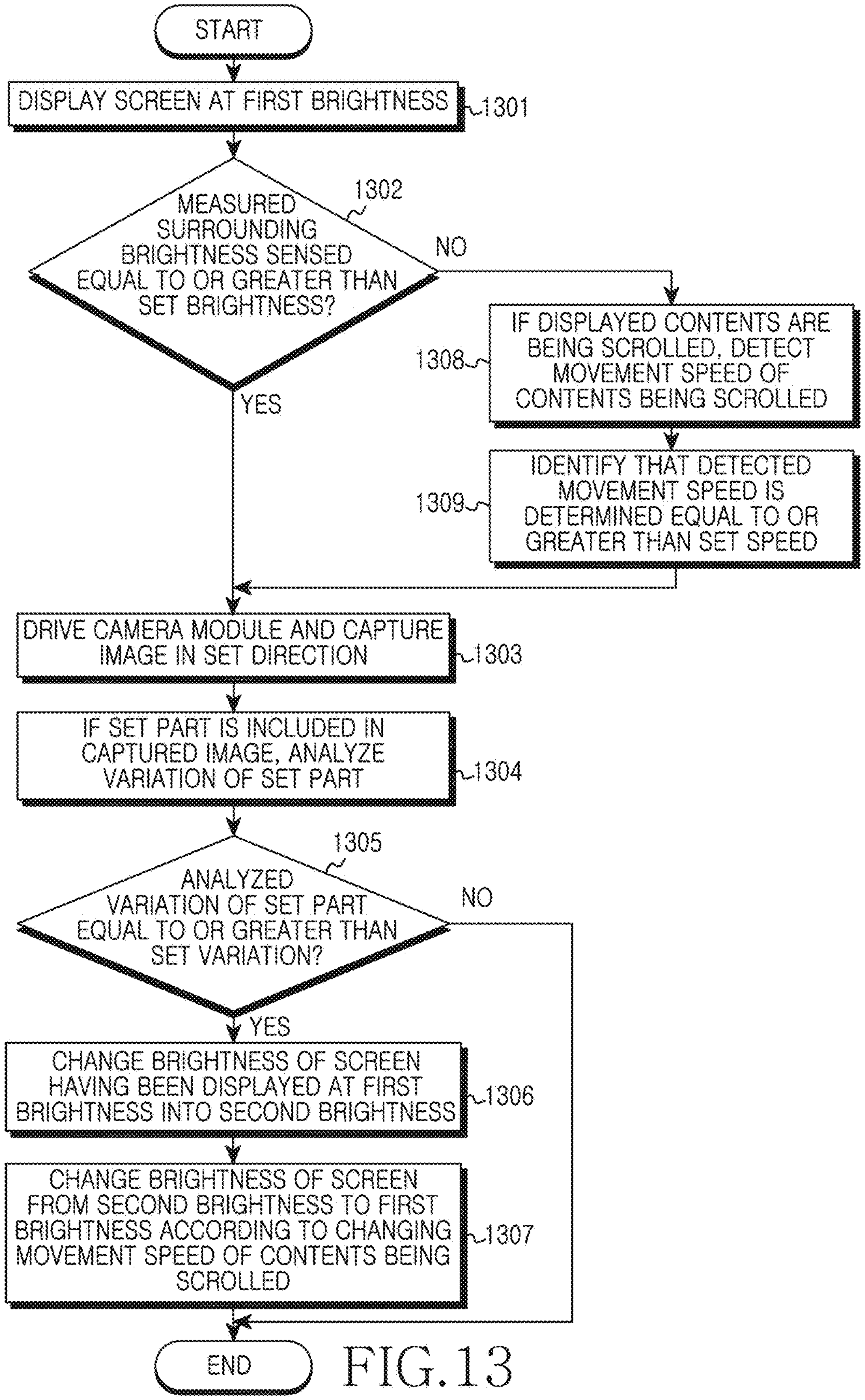
FIG. 13 is a flowchart illustrating an embodiment of automatically adjusting a brightness of a screen by using an illumination sensor and a camera module according to an embodiment of the present disclosure.

FIG. 13 is a flowchart illustrating an embodiment of automatically adjusting a brightness of a screen by using an illumination sensor and a camera module according to an embodiment of the present disclosure.

First, as illustrated in FIG. 13, in operation 1301, an electronic device can display a screen at a first brightness. In detail, the electronic device can display the screen at the first brightness being a set default brightness.

After that, at operation 1302, the electronic device can determine if the measured surrounding brightness is sensed as being equal to or greater than a set brightness. In detail, in a state of displaying the screen being scrolled at the first brightness being the set default brightness, the electronic device can determine if the surrounding brightness is sensed as being equal to or greater than the set brightness by using the illumination sensor provided in the electronic device. For example, in a state of scrolling "content A" and "content B" on a touch screen, the electronic device can determine whether the surrounding brightness is sensed as being equal to or greater than the set brightness by using the illumination sensor provided in the electronic device.

If the measured surrounding brightness is sensed as being equal to or greater than the set brightness in the electronic device, at operation 1303, the electronic device can drive a camera module to capture an image in a set direction. In detail, the electronic device can detect a movement speed of at least one content being scrolled and, if the detected movement speed is determined as being equal to or greater than a set speed, the electronic device can drive the camera module to capture an image in the set direction. For example, assume that the set movement speed is equal to "V2", and the set direction is a front portion of the electronic device. In the aforementioned assumption, if a movement speed of "content C" being scrolled is detected equal to or greater than the set speed "V2" in the electronic device, the electronic device can capture an image with the front being the set direction.

Next, if a set part is included in the captured image, at operation 1304, the electronic device driving the camera module to capture an image in the set direction can analyze a variation of the set part. Here, the set part can be at least one part among the pupil of a human, eyebrows, and a distance between the eyebrows. In detail, if it is determined that at least one part among the set parts, which are the pupil of a human, the eyebrows, and the distance between the eyebrows, is included in the captured image as the result of capturing an image in the set direction in the electronic device, the electronic device can analyze the variation of the set part.

At operation 1305, the electronic device analyzing the variation of the set part can determine if the analyzed variation of the set part is equal to or is greater than a set variation. In detail, the electronic device can determine if the analyzed variation of the pupil of the user, the eyebrows, the distance between the eyebrows and the like is equal to or is greater than the set variation. For example, if a movement speed of at least one content being scrolled is detected equal to or greater than a set speed in the electronic device, the electronic device can capture an image in the set direction and determine whether the variation of the pupil being the set part included in the captured image is equal to or is greater than the set variation. This is for determining whether the user is feeling his/her eyestrain by means of a variation of a size of the pupil in the electronic device, because the size of the pupil of a human can increase when the surrounding brightness is suddenly changed brighter.

If the analyzed variation of the set part is determined as being equal to or greater than the set variation in the electronic device, at operation 1306, the electronic device can change the brightness of the screen having been displayed at the first brightness, into a second brightness. In detail, if the variation of the set part is determined as being equal to or greater than the set variation, the electronic device can change the brightness of the screen from the first brightness being the original default brightness to the second brightness being the set lowest brightness. Accordingly, there is an advantage of reducing the occurrence of eyestrain caused by a color of at least one content when the user opens at least one content of different color and size scrolled and moved on the touch screen of the electronic device.

After that, at operation 1307, the electronic device can change the brightness of the screen from the second brightness to the first brightness according to the changing movement speed of contents being scrolled. In detail, the electronic device can change the brightness of the screen into any one brightness of the screen matching to an identified speed level among set at least two or more brightness of the screen. That is, because the movement speed of contents being scrolled decreases gradually as time goes in the electronic device, the electronic device can automatically change the brightness of the screen according to each movement speed of contents. Finally, if a scrolling status of contents is a stop status, the electronic device can change the brightness of the screen into the first brightness being the set default brightness.

If the measured surrounding brightness is not sensed as being equal to or greater than the set brightness in the electronic device in the aforementioned determination process of operation 1302 and if the displayed contents are being scrolled, at operation 1308, the electronic device can detect a movement speed of the contents being scrolled. For example, if the measured surrounding brightness is not sensed as being equal to or greater than the set brightness in the electronic device, the electronic device can detect a movement speed of "content A" being scrolled.

Next, if it is identified that the detected movement speed is determined as being equal to or greater than the set speed at operation 1309, the electronic device repeats the aforementioned process of operation 1303. Also, if the analyzed variation of the set part is not determined as being equal to or greater than the set variation in the aforementioned determination process of operation 1305, the procedure of automatically adjusting the brightness of the screen can be all terminated at once.

Figure 14:
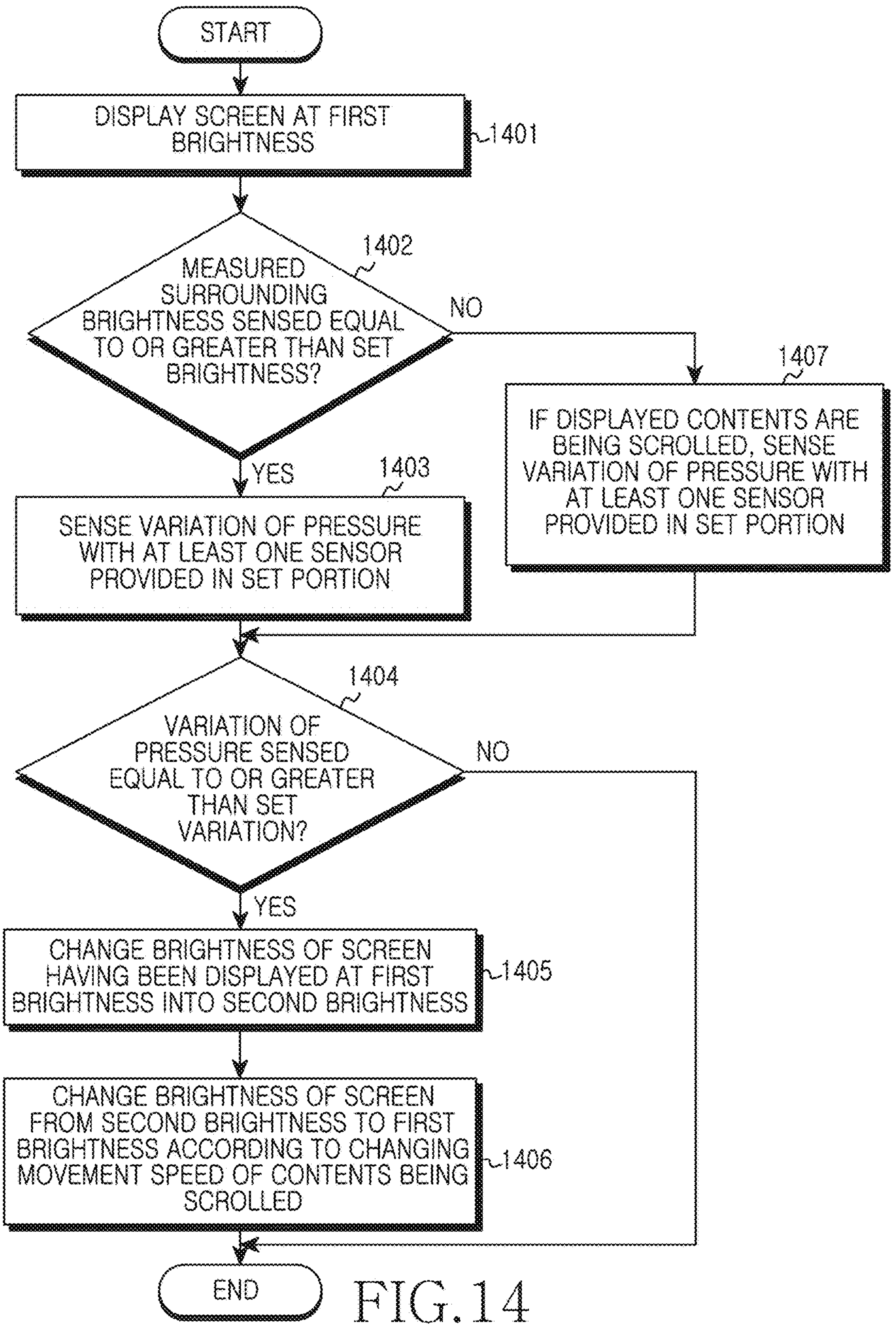
FIG. 14 is a flowchart illustrating a procedure of automatically adjusting a brightness of a screen by using an illumination sensor and a grip sensor according to an embodiment of the present disclosure.

FIG. 14 is a flowchart illustrating a procedure of automatically adjusting a brightness of a screen by using an illumination sensor and a grip sensor according to an embodiment of the present disclosure.

First, as illustrated in FIG. 14, at operation 1401, an electronic device can display a screen at a first brightness. In detail, the electronic device can display the screen at the first brightness being a set default brightness.

After that, at operation 1402, the electronic device can determine if the measured surrounding brightness is sensed as being equal to or greater than a set brightness. In detail, in a state of displaying the screen being scrolled at the first brightness being the set default brightness, the electronic device can determine if the surrounding brightness is sensed as being equal to or greater than the set brightness by using the illumination sensor provided in the electronic device. For example, in a state of scrolling "content A" and "content B" on a touch screen, the electronic device can determine whether the surrounding brightness is sensed as being equal to or greater than the set brightness by using the illumination sensor provided in the electronic device.

If the measured surrounding brightness is sensed as being equal to or greater than the set brightness in the electronic device, at operation 1403, the electronic device can sense a variation of pressure with at least one sensor provided in a set portion. In detail, the electronic device can provide grip sensors at the left and right portions of the electronic device to sense a variation of varying pressure. Undoubtedly, the electronic device may provide the grip sensors at the upper and lower portions of the electronic device as well as the left side and right side of the electronic device to sense the variation of pressure.

Next, at operation 1404, the electronic device can determine whether the variation of pressure is sensed as being equal to or greater than a set variation. In detail, the electronic device can determine whether the variation of pressure sensed using the grip sensor provided in the set portion is equal to or is greater than the set variation. For example, if a user more applies force to the electronic device and makes a motion of gripping the electronic device, the electronic device can identify that the variation of pressure is sensed as being equal to or greater than the set variation. In the same meaning, if the user makes a motion of decreasing a force of gripping the electronic device, the electronic device can identify that the variation of pressure is sensed as being equal to or greater than the set variation.

If the variation of pressure is sensed as being equal to or greater than the set variation in the electronic device, at operation 1405, the electronic device can change the brightness of the screen having been displayed at the first brightness, into a second brightness. In detail, if the electronic device senses the variation of pressure equal to or greater than the set variation from the at least one grip sensor provided in the set portion, the electronic device can change the brightness of the screen having been displayed at the first brightness being the set default brightness, into the second brightness being the set darkest brightness. For example, assume that the user makes a motion of scrolling the screen up or down in order to open a portion that is not currently displayed on a touch screen but is located at the lower side or upper side of contents. In the aforementioned assumption, if the user feels eyestrain due to at least one content being scrolled, he/she can apply more pressure than the first and makes a motion of gripping the electronic device such that the grip sensors provided at the left side and right side of the electronic device can sense the variation of pressure equal to or greater than the set variation. That is, if the electronic device senses the variation of pressure equal to or greater than the set variation from the grip sensors, the electronic device can change the brightness of the screen from the set default brightness to the set darkest brightness.

After that, at operation 1406, the electronic device can change the brightness of the screen from the second brightness to the first brightness according to the changing movement speed of contents being scrolled. In detail, the electronic device can change the brightness of the screen into any one brightness of the screen matching to an identified speed level among set at least two or more brightness of the screen. That is, because the movement speed of contents being scrolled decreases gradually as time goes in the electronic device, the electronic device can automatically change the brightness of the screen according to each movement speed of contents. Finally, if a scrolling status of contents is a stop status, the electronic device can change the brightness of the screen into the first brightness being the set default brightness.

If the set surrounding brightness is not sensed as being equal to or greater than the set brightness in the electronic device in the aforementioned determination process of operation 1402 and if displayed contents are being scrolled, at operation 1407, the electronic device can sense the variation of pressure with at least one sensor provided in the set portion and then repeat the aforementioned determination of operation 1404. Also, if the variation of pressure is not sensed as being equal to or greater than the set variation in the electronic device in the aforementioned determination process of operation 1404, the electronic device can terminate at once the procedure of automatically adjusting the brightness of the screen.

Figure 15:
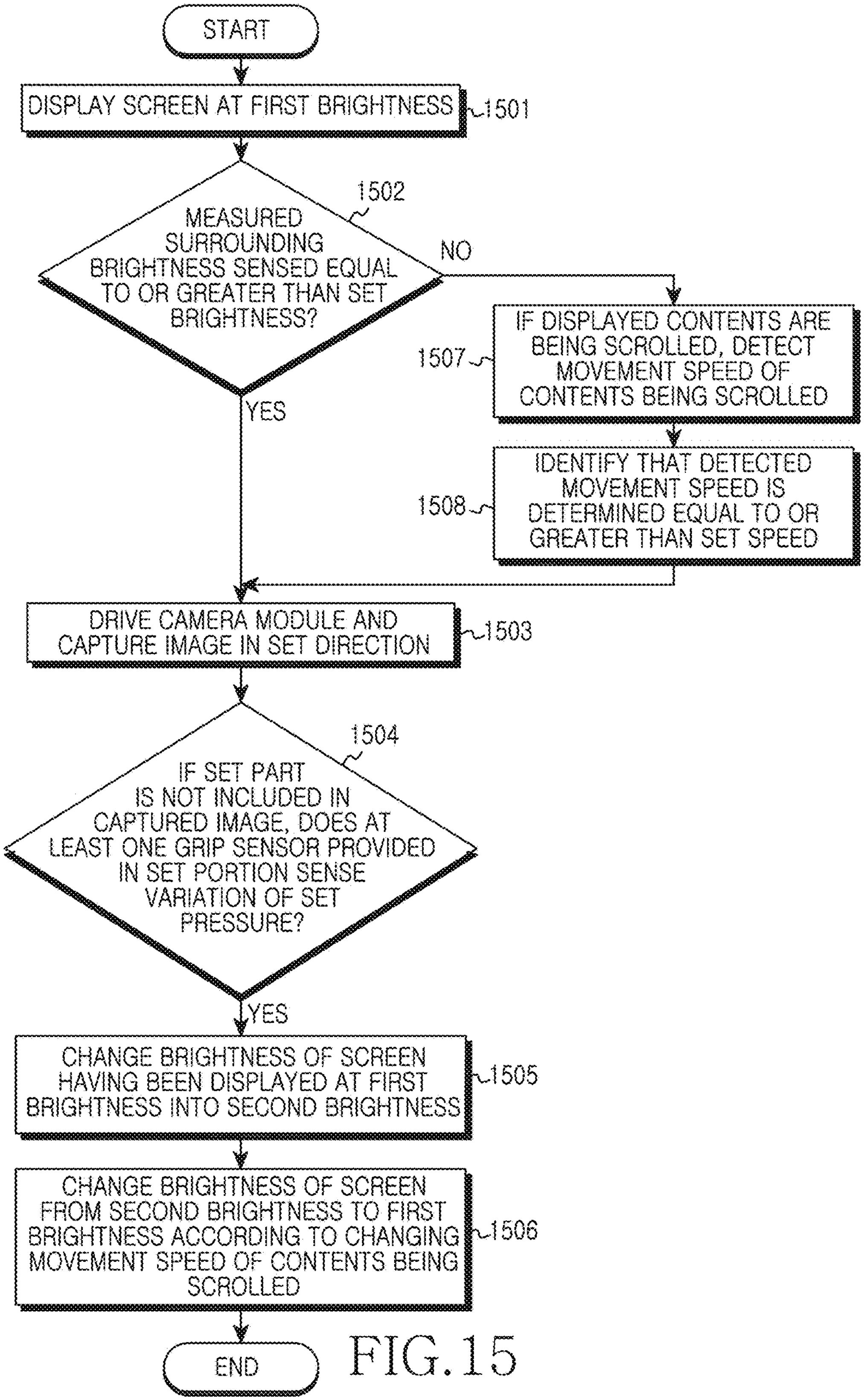
FIG. 15 is a flowchart illustrating a procedure of automatically adjusting a brightness of a screen by using an illumination sensor, a camera module, and a grip sensor according to an embodiment of the present disclosure.

FIG. 15 is a flowchart illustrating a procedure of automatically adjusting a brightness of a screen by using an illumination sensor, a camera module, and a grip sensor according to an embodiment of the present disclosure.

First, as illustrated in FIG. 15, at operation 1501, an electronic device can display a screen at a first brightness. In detail, the electronic device can display the screen at the first brightness being a set default brightness.

After that, at operation 1502, the electronic device can determine if the measured surrounding brightness is sensed as being equal to or greater than a set brightness. In detail, in a state of displaying the screen being scrolled at the first brightness being the set default brightness, the electronic device can determine if the surrounding brightness is sensed as being equal to or greater than the set brightness by using the illumination sensor provided in the electronic device. For example, in a state of scrolling "content A" and "content B" on a touch screen, the electronic device can determine whether the surrounding brightness is sensed as being equal to or greater than the set brightness by using the illumination sensor provided in the electronic device.

If the measured surrounding brightness is sensed as being equal to or greater than the set brightness in the electronic device, at operation 1503, the electronic device can drive a camera module to capture an image in a set direction. In detail, the electronic device can detect the movement speed of at least one content being scrolled and, if the detected movement speed is determined as being equal to or greater than the set speed, the electronic device can drive the camera module to capture an image in the set direction. For example, assume that the set movement speed is equal to "V2", and the set direction is a front portion of the electronic device. In the aforementioned assumption, if a movement speed of "content C" being scrolled is detected equal to or greater than the set speed "V2" in the electronic device, the electronic device can capture an image in the front being the set direction.

Next, if a set part is not included in the captured image, at operation 1504, the electronic device can determine whether at least one grip sensor provided in a set portion senses a variation of a set pressure. In detail, if it is determined that at least one part among the set parts, which are the pupil of a human, eyebrows, and a distance between the eyebrows, is not included in the captured image as the result of analyzing the captured image in the electronic device, the electronic device can determine whether at least one grip sensor senses the variation of the set pressure.

If the electronic device senses the variation of the set pressure, at operation 1505, the electronic device can change the brightness of the screen having been displayed at the first brightness, into a second brightness. In detail, if the electronic device senses the variation of pressure equal to or greater than a set variation from the at least one grip sensor provided in the set portion, the electronic device can change the brightness of the screen having been displayed at the first brightness being the set default brightness, into the second brightness being the set darkest brightness. That is, there may be a case where, although an image is captured in the set direction using the camera module in the electronic device, the set part may not be included in the image captured by the electronic device. If the user feels eyestrain due to at least one content being scrolled, he/she enables grip sensors provided at the left side and right side of the electronic device to sense the variation of pressure equal to or greater than the set variation, thereby being capable of adjusting the brightness of the screen.

Next, at operation 1506, the electronic device can change the brightness of the screen from the second brightness to the first brightness according to the changing movement speed of contents being scrolled. In detail, the electronic device can change the brightness of the screen into any one brightness of the screen matching to an identified speed level among set at least two or more brightness of the screen. That is, because the movement speed of the contents being scrolled decreases gradually as time goes in the electronic device, the electronic device can automatically change the brightness of the screen according to each movement speed of contents. Finally, if a scrolling status of contents is a stop status, the electronic device can change the brightness of the screen into the first brightness being the set default brightness.

If the measured surrounding brightness is not sensed as being equal to or greater than the set brightness in the electronic device in the aforementioned determination process of operation 1502 and if the displayed contents are being scrolled, at operation 1507, the electronic device can detect a movement speed of the contents being scrolled. For example, if the measured surrounding brightness is not sensed as being equal to or greater than the set brightness in the electronic device, the electronic device can detect a movement speed of "content A" being scrolled. Next, if it is identified that the detected movement speed is determined as being equal to or greater than the set speed at operation 1508, the electronic device repeats the aforementioned process of operation 1503.

Figure 16A:
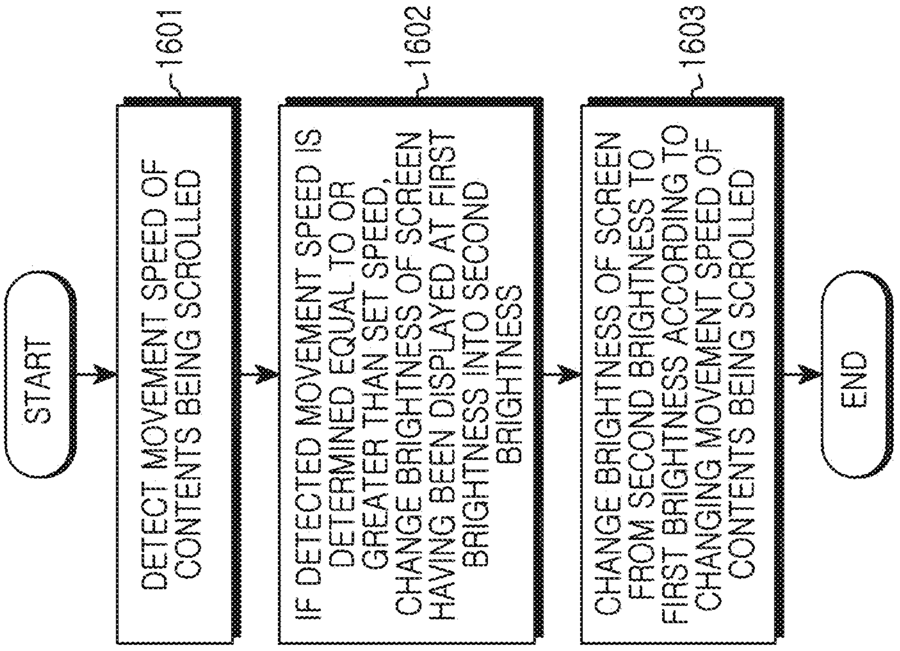
FIG. 16A is a flowchart illustrating a method of an electronic device automatically adjusting a brightness of a screen according to an embodiment of the present disclosure.

FIG. 16A is a flowchart illustrating a method of an electronic device automatically adjusting a brightness of a screen according to an embodiment of the present disclosure.

First, as illustrated in FIG. 16A, at operation 1601, the electronic device can detect a movement speed of contents being scrolled. For example, if the electronic device senses a motion of scrolling up, the electronic device can display on a touch screen "content C", "content D", etc. being at least one content that is currently unseen on the touch screen because being located at the lower side of the touch screen of the electronic device and concurrently, detect a movement speed of the content being scrolled.

Next, if the detected movement speed is determined as being equal to or greater than a set speed, at operation 1602, the electronic device can change the brightness of the screen having been displayed at the first brightness, into a second brightness. First, the electronic device can determine whether the detected movement speed is equal to or is greater than the set speed. For example, if two contents "content C" and "content D" are being scrolled on the touch screen of the electronic device, the electronic device can detect a movement speed of the two contents being scrolled, and determine whether the detected movement speed is equal to or is greater than the set speed. If the detected movement speed is determined as being equal to or greater than the set speed in the electronic device, the electronic device can change the brightness of the screen having been displayed at the first brightness, into the second brightness. For example, assume that "V1" denotes a speed set in the electronic device. In the aforementioned assumption, if the detected movement speed is determined as being equal to or greater than the set speed "V1" as the result of detecting the movement speed of at least one content being scrolled in the electronic device, the electronic device can change the brightness of the screen from the first brightness being a set default brightness to the second brightness being the set darkest brightness.

Next, at operation 1603, the electronic device can change the brightness of the screen from the second brightness to the first brightness according to the changing movement speed of the contents being scrolled. In detail, the electronic device can change the brightness of the screen into any one brightness of the screen matching to an identified speed level among set at least two or more brightness of the screen. That is, because the movement speed of the contents being scrolled decreases gradually as time goes in the electronic device, the electronic device can automatically change the brightness of the screen according to each movement speed of contents. Finally, if a scrolling status of contents is a stop status, the electronic device can change the brightness of the screen into the first brightness being the set default brightness. Accordingly, there is an advantage that the electronic device decreases user's eyestrain by automatically adjusting the brightness of the screen according to a scrolling speed of contents being displayed on the touch screen.

Figure 16B:
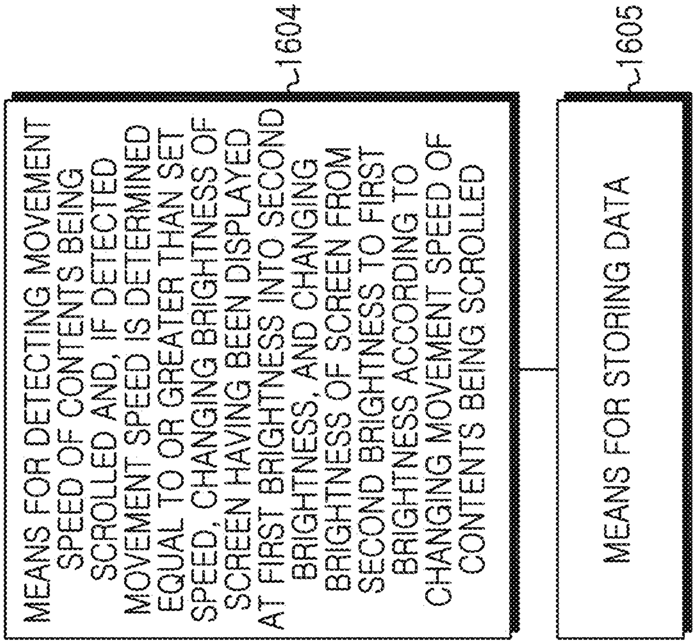
FIG. 16B is a diagram illustrating an electronic device for automatically adjusting a brightness of a screen according to an embodiment of the present disclosure.

FIG. 16B is a diagram illustrating an electronic device for automatically adjusting a brightness of a screen according to an embodiment of the present disclosure.

As illustrated in FIG. 16B, included is a means 1604 (e.g., a processor unit of an electronic device) that can detect a movement speed of contents being scrolled, if the detected movement speed is determined as being equal to or greater than a set speed, can change the brightness of the screen having been displayed at the first brightness into a second brightness, and can change the brightness of the screen from the second brightness to the first brightness according to the changing movement speed of the contents being scrolled. For example, if two contents "content C" and "content D" are being scrolled on the touch screen of the electronic device, the means 1604 can detect a movement speed of the two contents being scrolled, and determine whether the detected movement speed is equal to or is greater than the set speed. If the detected movement speed is determined as being equal to or greater than the set speed in the means 1604, the means 1604 can change the brightness of the screen having been displayed at the first brightness, into the second brightness. For example, assume that "V1" denotes a speed set in the electronic device. In the aforementioned assumption, if the detected movement speed is determined as being equal to or greater than the set speed "V1" as the result of detecting the movement speed of at least one content being scrolled, the means 1604 can change the brightness of the screen from the first brightness being the set default brightness to the second brightness being the set darkest brightness. Next, the means 1604 can change the brightness of the screen from the second brightness to the first brightness according to the changing movement speed of the contents being scrolled. In detail, the means 1604 can change the brightness of the screen into any one brightness of the screen matching to an identified speed level among set at least two or more brightness of the screen. That is, because the movement speed of the contents being scrolled decreases gradually as time goes in the means 1604, the means 1604 can automatically change the brightness of the screen according to each movement speed of contents. Finally, if a scrolling status of contents is a stop status, the means 1604 can change the brightness of the screen into the first brightness being the set default brightness.

A means 1605 (e.g., a memory of the electronic device) can store data controlled by the means 1604. Here, the means 1605 can store software. A software constituent element can include an OS module, a communication module, a graphic module, a user interface module, a Moving Picture Experts Group (MPEG) module, a camera module, one or more application modules and the like.

Figure 17A:
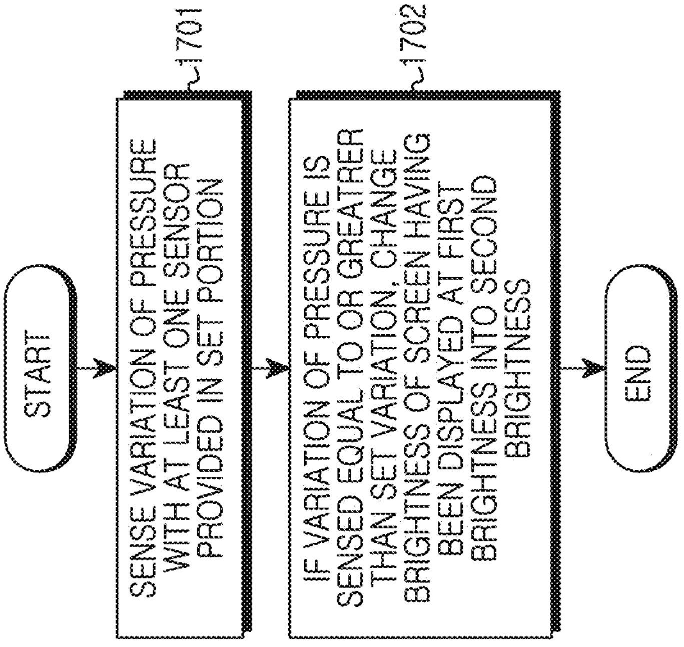
FIG. 17A is a flowchart illustrating a method of an electronic device automatically adjusting a brightness of a screen by using a grip sensor according to an embodiment of the present disclosure.

FIG. 17A is a flowchart illustrating a method of an electronic device automatically adjusting a brightness of a screen by using a grip sensor according to an embodiment of the present disclosure.

First, as illustrated in FIG. 17A, at operation 1701, the electronic device can sense a variation of pressure with at least one sensor provided in a set portion. In detail, the electronic device can provide grip sensors at the left and right portions of the electronic device to sense a variation of varying pressure. Undoubtedly, the electronic device may provide the grip sensors at the upper and lower portions of the electronic device as well as the left side and right side of the electronic device to sense the variation of pressure.

Next, if the sensed variation of pressure is equal to or is greater than a set variation, at operation 1702, the electronic device can change the brightness of the screen having been displayed at a first brightness, into a second brightness. First, the electronic device can determine whether the variation of pressure is sensed as being equal to or greater than the set variation. In detail, the electronic device can determine whether the variation of pressure sensed using the grip sensor provided in the set portion is equal to or is greater than the set variation. For example, if a user more applies force to the electronic device and makes a motion of gripping the electronic device, the electronic device can identify that the variation of pressure is sensed as being equal to or greater than the set variation. In the same meaning, if the user makes a motion of decreasing a force of gripping the electronic device, the electronic device can identify that the variation of pressure is sensed as being equal to or greater than the set variation. If the variation of pressure is sensed as being equal to or greater than the set variation in the electronic device, the electronic device can change the brightness of the screen having been displayed at the first brightness, into the second brightness. In detail, if the electronic device senses the variation of pressure equal to or greater than the set variation from the at least one grip sensor provided in the set portion, the electronic device can change the brightness of the screen having been displayed at the first brightness being the set default brightness, into the second brightness being the set darkest brightness. For example, assume that the user makes a motion of scrolling the screen up or down in order to open a portion that is not currently displayed on a touch screen but is located at the lower side or upper side of contents. In the aforementioned assumption, if the user feels eyestrain due to at least one content being scrolled, he/she can apply more pressure than the first and make a motion of gripping the electronic device such that the grip sensors provided at the left side and right side of the electronic device can sense the variation of pressure equal to or greater than the set variation. That is, if the electronic device senses the variation of pressure equal to or greater than the set variation from the grip sensors, the electronic device can change the brightness of the screen from the set default brightness to the set darkest brightness.

Figure 17B:
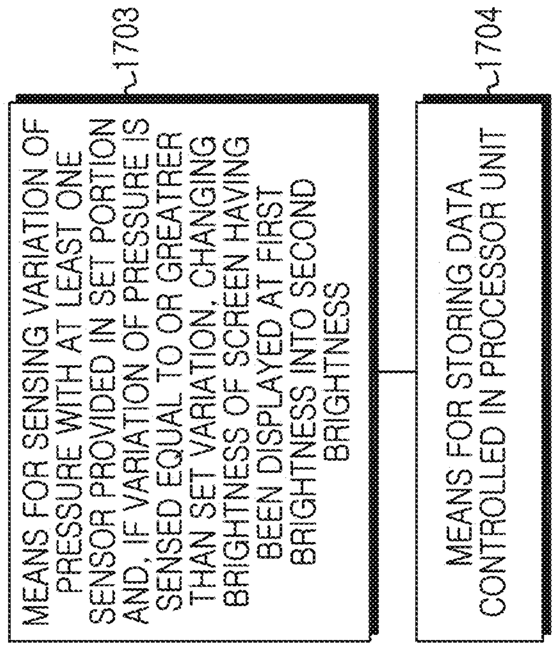
FIG. 17B is a diagram illustrating an electronic device for automatically adjusting a brightness of a screen by using a grip sensor according to an embodiment of the present disclosure.

FIG. 17B is a diagram illustrating an electronic device for automatically adjusting a brightness of a screen by using a grip sensor according to an embodiment of the present disclosure.

As illustrated in FIG. 17B, included is a means 1703 (e.g., a processor unit of the electronic device) that can sense a variation of pressure with at least one sensor provided in a set portion and, if the sensed variation of pressure is equal to or is greater than a set variation, can change the brightness of the screen having been displayed at first brightness, into a second brightness. In detail, the means 1703 can provide grip sensors at the left and right portions of the electronic device to sense a variation of varying pressure. Undoubtedly, the means 1703 may provide the grip sensors at the upper and lower portions of the electronic device as well as the left side and right side of the electronic device to sense the variation of pressure. Next, if the sensed variation of pressure is equal to or is greater than the set variation, the means 1703 can change the brightness of the screen having been displayed at the first brightness, into the second brightness. First, the means 1703 can determine whether the variation of pressure is sensed as being equal to or greater than the set variation. In detail, the means 1703 can determine whether the variation of pressure sensed using the grip sensor provided in the set portion is equal to or is greater than the set variation. For example, if a user more applies force to the electronic device and makes a motion of gripping the electronic device, the means 1703 can identify that the variation of pressure is sensed as being equal to or greater than the set variation. In the same meaning, if the user makes a motion of decreasing a force of gripping the electronic device, the means 1703 can identify that the variation of pressure is sensed as being equal to or greater than the set variation. If the variation of pressure is sensed as being equal to or greater than the set variation in the processor unit, the means 1703 can change the brightness of the screen having been displayed at the first brightness, into the second brightness. In detail, if the means 1703 senses the variation of pressure equal to or greater than the set variation from the at least one grip sensor provided in the set portion, the means 1703 can change the brightness of the screen having been displayed at the first brightness being the set default brightness, into the second brightness being the set darkest brightness. For example, assume that the user makes a motion of scrolling the screen up or down in order to open a portion that is not currently displayed on a touch screen but is located at the lower side or upper side of contents. In the aforementioned assumption, if the user feels eyestrain due to at least one content being scrolled, he/she can apply more pressure than the first and make a motion of gripping the electronic device such that the grip sensors provided at the left side and right side of the means 1703 can sense the variation of pressure equal to or greater than the set variation. That is, if the means 1703 senses the variation of pressure equal to or greater than the set variation from the grip sensors, the means 1703 can change the brightness of the screen from the set default brightness to the set darkest brightness.

A means 1704 (e.g., a memory of the electronic device) can store data controlled by the means 1703. Here, the memory can store software. A software constituent element can include an OS module, a communication module, a graphic module, a user interface module, an MPEG module, a camera module, one or more application modules and the like.

Figure 18B:
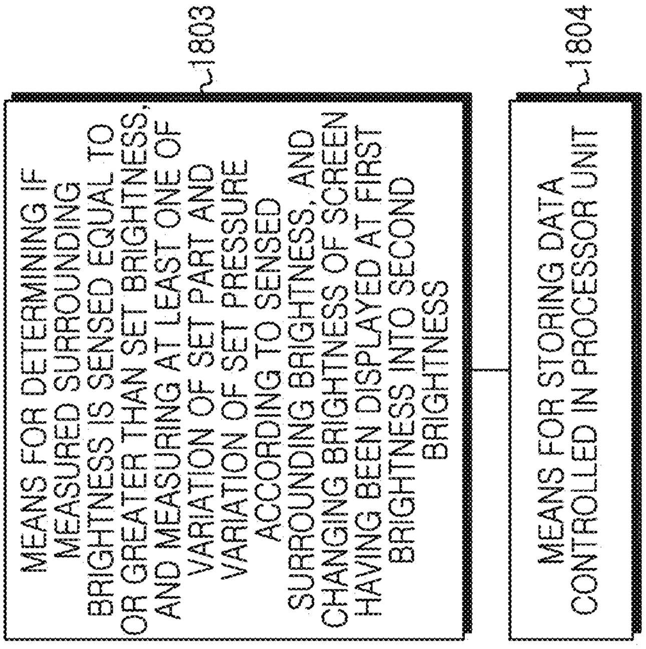
FIG. 18B is a diagram illustrating an electronic device for automatically adjusting a brightness of a screen by using an illumination sensor, a camera module, and a grip sensor according to an embodiment of the present disclosure.
Figure 18A:
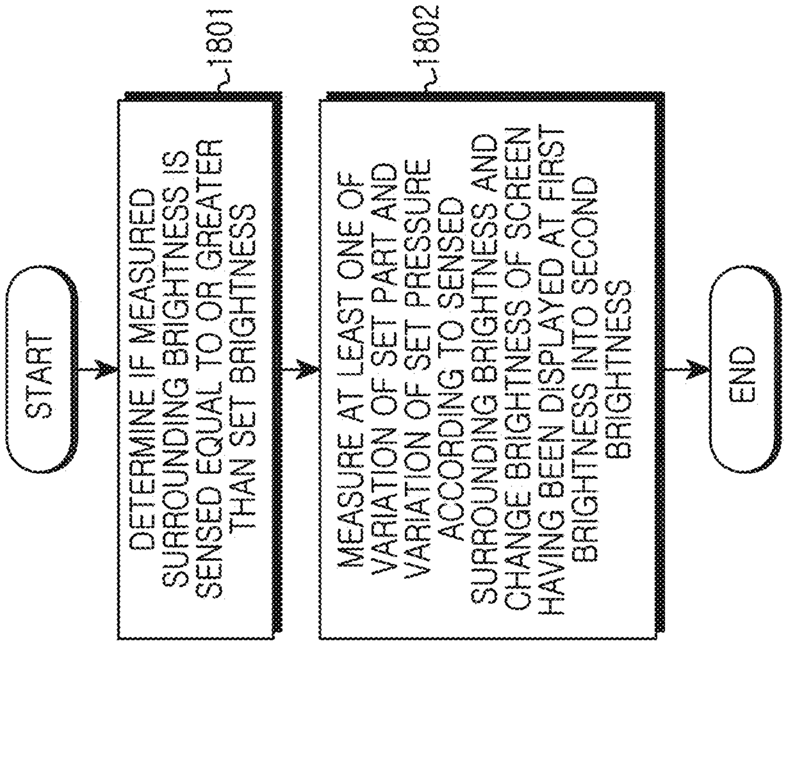
FIG. 18A is a flowchart illustrating a method of an electronic device automatically adjusting a brightness of a screen by using an illumination sensor, a camera module, and a grip sensor according to an embodiment of the present disclosure.

FIG. 18A is a flowchart illustrating a method of an electronic device automatically adjusting a brightness of a screen by using an illumination sensor, a camera module, and a grip sensor according to an embodiment of the present disclosure.

First, as illustrated in FIG. 18A, at operation 1801, the electronic device can determine if the measured surrounding brightness is sensed as being equal to or greater than a set brightness. In detail, in a state of displaying the screen being scrolled at a first brightness being a set default brightness, the electronic device can determine if the surrounding brightness is sensed as being equal to or greater than the set brightness by using the illumination sensor provided in the electronic device. For example, in a state of scrolling "content A" and "content B" on a touch screen, the electronic device can determine whether the surrounding brightness is sensed as being equal to or greater than the set brightness by using the illumination sensor provided in the electronic device.

Next, at operation 1802, the electronic device can measure at least one of a variation of a set part and a variation of a set pressure according to the sensed surrounding brightness and change the brightness of the screen having been displayed at the first brightness, into a second brightness. In detail, the electronic device can detect a movement speed of at least one content being scrolled and, if the detected movement speed is determined as being equal to or greater than a set speed, the electronic device can drive a camera module to capture an image in a set direction. After that, if the set part is not included in the captured image, the electronic device can determine whether at least one grip sensor provided in a set portion senses the variation of the set pressure. In detail, if it is determined that at least one part among the set parts, which are the pupil of a human, eyebrows, and a distance between the eyebrows, is not included in the captured image as the result of analyzing the captured image in the electronic device, the electronic device can determine whether at least one grip sensor senses the variation of the set pressure.

If the electronic device senses the variation of the set pressure, the electronic device can change the brightness of the screen having been displayed at the first brightness, into the second brightness. In detail, if the electronic device senses a variation of pressure equal to or greater than a set variation from the at least one grip sensor provided in the set portion, the electronic device can change the brightness of the screen having been displayed at the first brightness being the set default brightness, into the second brightness being the set darkest brightness. That is, there may be a case where, although an image is captured in the set direction using the camera module in the electronic device, the set part may not be included in the captured image. If the user feels eyestrain due to at least one content being scrolled, he/she enables grip sensors provided at the left side and right side of the electronic device to sense the variation of pressure equal to or greater than the set variation, thereby being capable of adjusting the brightness of the screen.

Next, the electronic device can change the brightness of the screen from the second brightness to the first brightness according to the changing movement speed of contents being scrolled. In detail, the electronic device can change the brightness of the screen into any one brightness of the screen matching to an identified speed level among set at least two or more brightness of the screen. That is, because the movement speed of the contents being scrolled decreases gradually as time goes in the electronic device, the electronic device can automatically change the brightness of the screen according to each movement speed of contents. Finally, if a scrolling status of contents is a stop status, the electronic device can change the brightness of the screen into the first brightness being the set default brightness. If the measured surrounding brightness is not sensed as being equal to or greater than the set brightness in the electronic device and the displayed contents are being scrolled, the electronic device can detect a movement speed of the contents being scrolled. Next, if it is identified that the detected movement speed is determined as being equal to or greater than the set speed, the electronic device repeats the process of driving the camera module to capture an image in the set direction.

FIG. 18B is a diagram illustrating an electronic device for automatically adjusting a brightness of a screen by using an illumination sensor, a camera module, and a grip sensor according to an embodiment of the present disclosure.

As illustrated in FIG. 18B, included is a means 1803 (e.g., a processor unit of the electronic device) that can determine if the measured surrounding brightness is sensed as being equal to or greater than a set brightness, and measure at least one of a variation of a set part and a variation of a set pressure according to the sensed surrounding brightness and change the brightness of the screen having been displayed at a first brightness, into a second brightness. In detail, in a state of displaying the screen being scrolled at the first brightness being a set default brightness, the means 1803 can determine if the surrounding brightness is sensed as being equal to or greater than the set brightness by using the illumination sensor provided in the electronic device.

Next, the means 1803 can measure at least one of the variation of the set part and the variation of the set pressure according to the sensed surrounding brightness and change the brightness of the screen having been displayed at the first brightness, into the second brightness. In detail, the means 1803 can detect a movement speed of at least one content being scrolled and, if the detected movement speed is determined as being equal to or greater than the set speed, the means 1803 can drive a camera module to capture an image in a set direction. After that, if the set part is not included in the captured image, the means 1803 can determine whether at least one grip sensor provided in a set portion senses the variation of the set pressure. In detail, if it is determined that at least one part among the set parts, which are the pupil of a human, eyebrows, and a distance between the eyebrows, is not included in the captured image as the result of analyzing the captured image in the processor unit, the means 1803 can determine whether at least one grip sensor senses the variation of the set pressure.

If the means 1803 senses the variation of the set pressure, the means 1803 can change the brightness of the screen having been displayed at the first brightness, into the second brightness. In detail, if the means 1803 senses a variation of pressure equal to or greater than a set variation from the at least one grip sensor provided in the set portion, the means 1803 can change the brightness of the screen having been displayed at the first brightness being the set default brightness, into the second brightness being the set darkest brightness. That is, there may be a case where, although an image is captured in the set direction using the camera module in the electronic device, the set part may not be included in the captured image. If the user feels eyestrain due to at least one content being scrolled, he/she enables grip sensors provided at the left side and right side of the electronic device to sense the variation of pressure equal to or greater than the set variation, thereby being capable of adjusting the brightness of the screen.

Next, the means 1803 can change the brightness of the screen from the second brightness to the first brightness according to the changing movement speed of contents being scrolled. In detail, the means 1803 can change the brightness of the screen into any one brightness of the screen matching to an identified speed level among set at least two or more brightness of the screen. That is, because the movement speed of the contents being scrolled decreases gradually as time goes in the electronic device, the means 1803 can automatically change the brightness of the screen according to each movement speed of contents. Finally, if a scrolling status of contents is a stop status, the means 1803 can change the brightness of the screen into the first brightness being the set default brightness. If the measured surrounding brightness is not sensed as being equal to or greater than the set brightness in the means 1803 and the displayed contents are being scrolled, the means 1803 can detect the movement speed of the contents being scrolled. Next, if it is identified that the detected movement speed is determined as being equal to or greater than the set speed, the means 1803 repeats the process of driving the camera module to capture an image in the set direction.

A means 1804 (e.g., a memory of the electronic device) can store data controlled by the means 1803. Here, the memory can store software. A software constituent element can include an OS module, a communication module, a graphic module, a user interface module, an MPEG module, a camera module, one or more application modules and the like.

Figure 19:
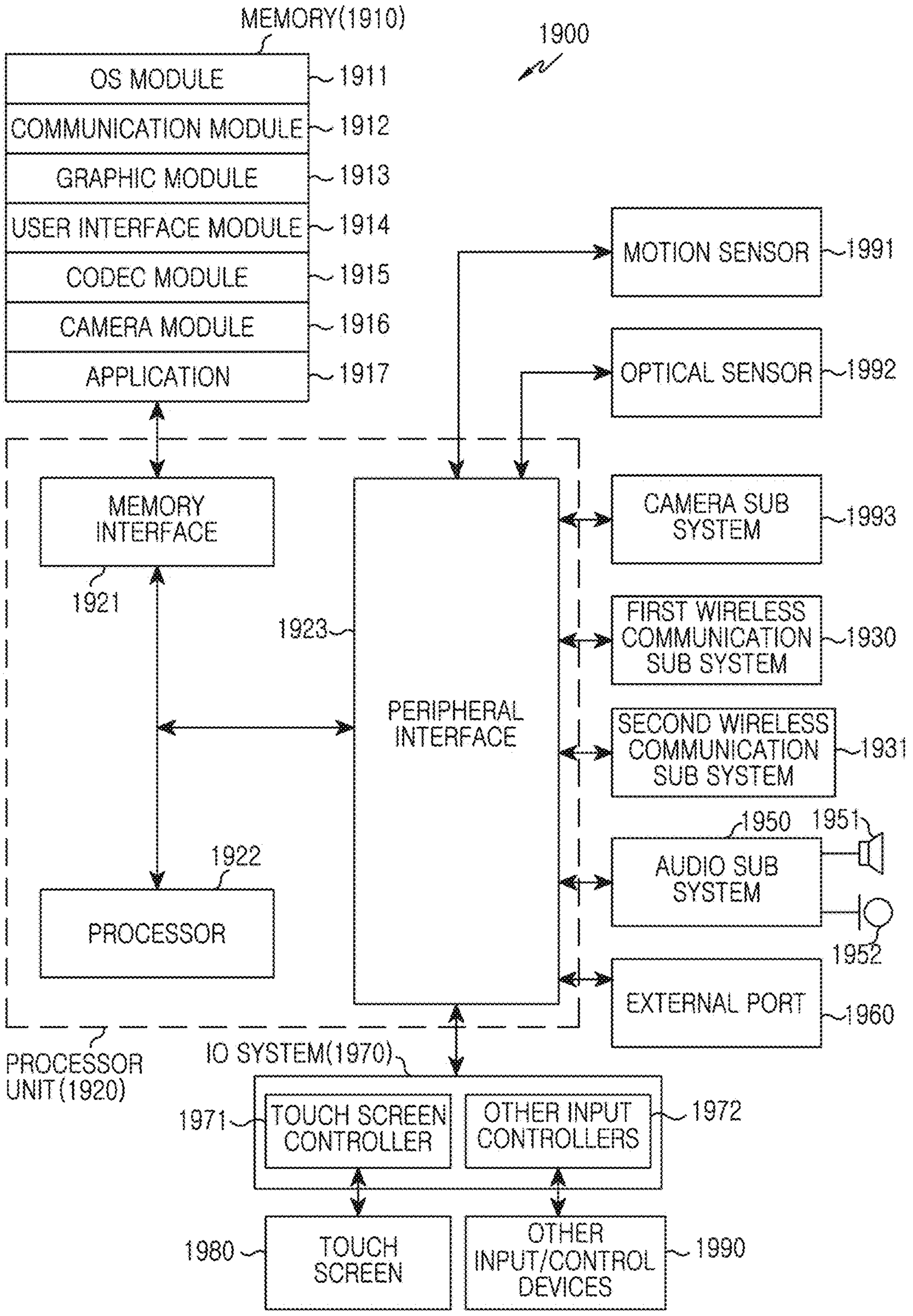
FIG. 19 is a block diagram illustrating a construction of an electronic device according to an embodiment of the present disclosure.

FIG. 19 is a block diagram illustrating a construction of an electronic device according to an embodiment of the present disclosure.

This electronic device 1900 can be a portable electronic device, and can be a device such as a portable terminal, a mobile phone, a mobile pad, a media player, a tablet computer, a handheld computer, or a Personal Digital Assistant (PDA). Also, the electronic device may be any portable electronic device including a device combining two or more functions among these devices.

The electronic device 1900 includes a memory 1910, a processor unit 1920, a first wireless communication sub system 1930, a second wireless communication sub system 1931, an audio sub system 1950, a speaker 1951, a microphone 1952, an external port 1960, an Input Output (IO) sub system 1970, a touch screen 1980, and other input or control devices 1990. The memory 1910 and the external port 1960 can be used in plurality.

The processor unit 1920 can include a memory interface 1921, one or more processors 1922, and a peripheral interface 1923. According to cases, the whole processor unit 1920 is also called a processor. In the present disclosure, the processor unit 1920 can detect a movement speed of contents being scrolled. If the detected movement speed is determined as being equal to or greater than a set speed, the processor unit 1920 can change the brightness of the screen having been displayed at a first brightness, into a second brightness and, according to the changing movement speed of the contents being scrolled, the processor unit 1920 can change the brightness of the screen from the second brightness to the first brightness. Also, the processor unit 1920 can sense that the contents being displayed at the first brightness are being scrolled. Also, if a set part is included in the captured image, the processor unit 1920 can analyze a variation of the set part. If the analyzed variation of the set part is determined as being equal to or greater than a set variation, the processor unit 1920 can change the brightness of the screen having been displayed at the first brightness, into the second brightness. Also, if the set part is not included in the captured image, the processor unit 1920 can determine whether at least one grip sensor provided in a set portion senses a variation of a set pressure. If at least one grip sensor senses the variation of the set pressure, the processor unit 1920 can change the brightness of the screen having been displayed at the first brightness, into the second brightness. Also, the processor unit 1920 can sense a changing movement speed of contents being scrolled, and identify that the sensed movement speed of the contents corresponds to any one speed level among set at least two or more speed levels, and change the brightness of the screen into any one brightness of the screen matching to an identified speed level among set at least two or more brightness of the screen. If a scrolling status of contents is a stop status, the processor unit 1920 can change the brightness of the screen into the first brightness. Also, if a variation of pressure is sensed as being equal to or greater than a set variation, the processor unit 1920 can change the brightness of the screen having been displayed at the first brightness, into the second brightness. Also, the processor unit 1920 can display the screen at the first brightness, and count time from the time when the brightness of the screen is changed into the second brightness, and change the brightness of the screen into any one brightness of the screen matching to the counted time among set at least two or more brightness of the screen. If the counted time exceeds a set time, the processor unit 1920 can change the brightness of the screen into the first brightness. Also, the processor unit 1920 can measure at least one of a variation of the set part and the variation of the set pressure according to the sensed surrounding brightness and change the brightness of the screen having been displayed at the first brightness into the second brightness. Also, if the sensed surrounding brightness is not sensed as being equal to or greater than a set brightness, the processor unit 1920 can determine whether the displayed contents are being scrolled. If the variation of pressure is sensed as being equal to or greater than the set variation, the processor unit 1920 can change the brightness of the screen having been displayed at the first brightness into the second brightness. Also, if the sensed surrounding brightness is not sensed as being equal to or greater than the set brightness, the processor unit 1920 can determine whether the displayed contents are being scrolled. If the contents are being scrolled, the processor unit 1920 can detect a movement speed of the contents being scrolled. If the set part is not included in the captured image, the processor unit 1920 can determine if at least one grip sensor provided in a set portion senses the variation of the set pressure. If the at least one grip sensor senses the variation of the set pressure, the processor unit 1920 can change the brightness of the screen having been displayed at the first brightness into the second brightness. Also, the processor unit 1920 can count time from the time when the brightness of the screen is changed into the second brightness, and change the brightness of the screen into any one brightness of the screen matching to the counted time among set at least two or more brightness of the screen. If the counted time exceeds a set time, the processor unit 1920 can change the brightness of the screen into the first brightness. Also, the processor unit 1920 can sense a changing movement speed of contents being scrolled, and identify that the sensed movement speed of the contents corresponds to any one speed level among set at least two or more speed levels, and change the brightness of the screen into any one brightness of the screen matching to an identified speed level among set at least two or more brightness of the screen. If a scrolling status of contents is a stop status, the processor unit 1920 can change the brightness of the screen into the first brightness.

The processor 1922 executes various software programs and performs various functions for the electronic device 1900, and also performs processing and control for voice communication and data communication. Also, in addition to this general function, the processor 1922 plays even a role of executing a specific software module (i.e., an instruction set) stored in the memory 1910 and performing specific various functions corresponding to the software module. That is, the processor 1922 interworks with the software modules stored in the memory 1910 and carries out a method of an embodiment of the present disclosure.

The processor 1922 can include one or more data processors, image processors, or COder/DECoders (CODECs). The data processor, the image processor, or the CODEC may be constructed separately. Also, the processor 1922 may be composed of several processors performing different functions. The peripheral interface 1923 connects the IO sub system 1970 of the electronic device 1900 and various peripheral devices thereof to the processor 1922 and to the memory 1910 through the memory interface 1921.

Various constituent elements of the electronic device 1900 can be coupled with one another by one or more communication buses (not denoted by reference numerals) or stream lines (not denoted by reference numerals).

The external port 1960 is used for direct connecting a portable electronic device to other electronic devices or indirect connects the portable electronic device to other electronic devices over a network (for example, the Internet, an intranet, a Wireless Local Area Network (WLAN) and the like). For example, the external port 1960 refers to, although not limited to, a Universal Serial Bus (USB) port, a FIREWIRE port or the like.

A motion sensor 1991 and an optical sensor 1992 are coupled to the peripheral interface 1923 and enable various functions. For instance, the motion sensor 1991 and the optical sensor 1992 can be coupled to the peripheral interface 1923, and sense a motion of the electronic device 1900 and sense a light from the exterior, respectively. In addition to this, other sensors such as a global positioning system, a temperature sensor, a biological sensor or the like can be coupled to the peripheral interface 1923 and perform related functions.

A camera sub system 1993 can perform a camera function such as picture and video clip recording.

The optical sensor 1992 can use a Charged Coupled Device (CCD) device or Complementary Metal-Oxide Semiconductor (CMOS) device.

A communication function is performed through one or more wireless communication sub systems 1930 and 1931. The wireless communication sub systems 1930 and 1931 can include a Radio Frequency (RF) receiver and transceiver and/or an optical (e.g., infrared) receiver and transceiver. The first wireless communication sub system 1930 and the second wireless communication sub system 1931 can be distinguished according to a communication network in which the electronic device 1900 communicates. For example, the communication network can include a communication sub system designed to operate through, although not limited to, a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a Wireless Fidelity (Wi-Fi) network, a Wireless interoperability for Microwave Access (WiMAX) network, a Bluetooth network or/and the like. The first wireless communication sub system 1930 and the second wireless communication sub system 1931 may be combined and constructed as one wireless communication sub system.

The audio sub system 1950 can be coupled to the speaker 1951 and the microphone 1952, and take charge of input and output of an audio stream such as voice recognition, voice replication, digital recording, and telephony function. That is, the audio sub system 1950 communicates with a user through the speaker 1951 and the microphone 1952. The audio sub system 1950 receives a data stream through the peripheral interface 1923 of the processor unit 1920, converts the received data stream into an electric stream, and forwards the converted electric stream to the speaker 1951. The speaker 1951 converts the electric stream into human-audible sound waves and outputs the converted sound waves. The microphone 1952 converts sound waves forwarded from human or other sound sources into electric streams. Also, the microphone 1952 operates if any one of at least two or more second sensors senses that an object is located within a set distance. The audio sub system 1950 receives the converted electric streams from the microphone 1952. The audio sub system 1950 converts the received electric streams into audio data streams, and transmits the converted audio data streams to the peripheral interface 1923. The audio sub system 1950 can include a detachable earphone, headphone or headset.

The IO sub system 1970 includes a touch screen controller 1971 and/or other input controller 1972. The touch screen controller 1971 can be coupled to the touch screen 1980. The touch screen 1980 and the touch screen controller 1971 can detect a contact and a motion or an interruption thereof, by using, although not limited to, not only capacitive, resistive, infrared and surface acoustic wave technologies for determining one or more contact points with the touch screen 1980 but also any multi-touch sensing technology including other proximity sensor arrays or other elements. The other input controller 1972 can be coupled to the other input/control devices 1990. The other input/control devices 1990 can be at least one or more buttons, a rocker switch, a thumb-wheel, a dial, a stick, a pointer device such as a stylus and/or the like.

The touch screen 1980 provides an input output interface between the electronic device 1900 and a user. That is, the touch screen 1980 forwards a user's touch input to the electronic device 1900. Also, the touch screen 1980 is a medium for showing an output of the electronic device 1900 to the user. That is, the touch screen 1980 shows a visual output to the user. This visual output can be presented in form of a text, a graphic, a video, and a combination thereof.

The touch screen 1980 can use various displays. For example, the touch screen 1980 can use, although not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The memory 1910 can be coupled to the memory interface 1921. The memory 1910 can include high-speed random access memory and/or non-volatile memory such as one or more magnetic disk storage devices, one or more optical storage devices, and/or flash memories (for example, Not AND (NAND) memories, Not OR (NOR) memories).

The memory 1910 stores software. A software constituent element includes an OS module 1911, a communication module 1912, a graphic module 1913, a user interface module 1914, an CODEC module 1915, a camera module 1916, one or more application modules 1917 and the like. Also, because the module, the software constituent element, can be expressed as a set of instructions, the module may be expressed as an instruction set. The module may be also expressed as a program. The OS module 1911 represents a built-in operating system such as WINDOWS, LINUX, Darwin, RTXC, UNIX, OS X, or VxWorks, and includes various software constituent elements controlling general system operation. Control of the general system operation includes memory management and control, storage hardware (device) control and management, power control and management and the like. Further, the OS software performs even a function of making smooth communication between various hardware (devices) and software constituent elements (modules).

The communication module 1912 can enable communication with other electronic devices such as a personal computer, a server, a portable terminal and/or the like, through the first and second wireless communication sub systems 1930 and 1931 or the external port 1960.

The graphic module 1913 includes various software constituent elements for providing and displaying a graphic on the touch screen 1980. The term 'graphic' is used as meaning including a text, a web page, an icon, a digital image, a video, an animation and the like.

The user interface module 1914 includes various software constituent elements associated with a user interface. Further, the user interface module 1914 includes information about how a state of the user interface is changed and in which conditions the change of the state of the user interface is carried out, and the like.

The CODEC module 1915 can include a software constituent element related to encoding of a video file and decoding thereof. The CODEC module 1915 can include a video stream module such as an MPEG module and/or H204 module. Also, the CODEC module can include several audio file CODEC modules such as AAA, AMR, WMA and the like. Also, the CODEC module 1915 includes an instruction set corresponding to an embodiment method of the present disclosure.

The camera module 1916 includes a camera-related software constituent element enabling camera-related processes and functions.

The application module 1917 includes a browser, an electronic mail (e-mail), an instant message, word processing, keyboard emulation, an address book, a touch list, a widget, Digital Right Management (DRM), voice recognition, voice replication, a position determining function, a location-based service and the like.

Also, various functions of the electronic device 1900 according to the present disclosure mentioned above and to be mentioned below can be executed by hardware including one or more stream processing and/or Application Specific Integrated Circuits (ASICs), and/or software, and/or a combination of them.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:

displaying, on a display of the electronic device, a screen where content is included, wherein the screen is displayed with a first brightness;

in response to detecting that the content is scrolled, measuring, by using an illumination sensor of the electronic device, a surrounding brightness of the electronic device;

in response to determining that the surrounding brightness is not equal to or greater than a pre-set brightness, measuring a scroll speed at which the content is scrolled; and in response to determining that the scroll speed is equal to or greater than a threshold, displaying the screen with a second brightness while the content is scrolled, wherein the second brightness is darker than the first brightness.

2. The method of claim 1, further comprising:

determining a transparency for the screen according to the scroll speed; and applying the determined transparency to the displayed screen.

3. The method of claim 1, wherein the displaying of the screen comprises:

in response to determining that the scroll speed is equal to or greater than the threshold, capturing an image by driving a camera module;

determining a distance between eyebrows, a variation of the eyebrows, or a variation of a pupil included in the captured image; and in response to determining that the distance or the variation is equal to or greater than a variation threshold, displaying the screen with the second brightness.

4. The method of claim 1, wherein the displaying of the screen comprises:

detecting a pressure input for the electronic device by at least one grip sensor which is located on both sides of the electronic device; and in response to determining that a value for the pressure input is equal to or greater than a pressure threshold, displaying the screen with the second brightness.

5. The method of claim 1, further comprising:

in response to determining that the scroll speed is zero or another input is detected, displaying the screen with the first brightness.

6. An apparatus comprising:

a display; and at least one processor configured to:

display, on the display, a screen where content is included, wherein the screen is displayed with a first brightness, in response to detecting that the content is scrolled, measure, by using an illumination sensor of the apparatus, a surrounding brightness of the electronic device, in response to determining that the surrounding brightness is not equal to or greater than a pre-set brightness, measure a scroll speed at which the content is scrolled, and in response to determining that the scroll speed is equal to or greater than a threshold, display the screen with a second brightness while the content is scrolled, wherein the second brightness is darker than the first brightness.

7. The apparatus of claim 6, wherein the at least one processor is further configured to:

determine a transparency for the screen according to the scroll speed, and apply the determined transparency to the displayed screen.

8. The apparatus of claim 6, further comprising a camera module configured to, in response to determining that the scroll speed is equal to or greater than the threshold, capture an image, wherein the at least one processor is further configured to:

determine a distance between eyebrows, a variation of the eyebrows, or a variation of a pupil included in the captured image, and in response to determining that the distance or the variation is equal to or greater than a variation threshold, display the screen with the second brightness.

9. The apparatus of claim 6, further comprising at least one grip sensor configured to detect a pressure input for the electronic device and located on both sides of the apparatus, wherein the at least one processor is configured to:

in response to determining that a value for the pressure input is equal to or greater than a pressure threshold, display the screen with the second brightness.

10. The apparatus of claim 6, wherein the at least one processor is further configured to:

in response to determining that the scroll speed is zero or another input is detected, display the screen with the first brightness.

* * * * *